(12) United States Patent
Maier et al.

(10) Patent No.: US 11,479,688 B2
(45) Date of Patent: Oct. 25, 2022

(54) POLYMER WITH BRANCHED STRUCTURE

(71) Applicant: BASF SE, Ludwigshafen am Rhein (DE)

(72) Inventors: Matthias Maier, Ludwigshafen (DE); Clemens Auschra, Ludwigshafen (DE); Huiguang Kou, Ludwigshafen (DE)

(73) Assignee: BASF SE

( * ) Notice: Subject to any disclaimer, the term of this patent is extended or adjusted under 35 U.S.C. 154(b) by 177 days.

(21) Appl. No.: 16/611,265

(22) PCT Filed: Mar. 28, 2018

(86) PCT No.: PCT/EP2018/057896
§ 371 (c)(1),
(2) Date: Nov. 6, 2019

(87) PCT Pub. No.: WO2018/206195
PCT Pub. Date: Nov. 15, 2018

(65) Prior Publication Data
US 2020/0165368 A1    May 28, 2020

(30) Foreign Application Priority Data

May 10, 2017 (EP) .................................... 17170477
Nov. 10, 2017 (EP) .................................... 17201097

(51) Int. Cl.
| | | |
|---|---|---|
| *C08F 220/26* | (2006.01) | |
| *C08F 220/06* | (2006.01) | |
| *C08F 220/14* | (2006.01) | |
| *C09D 133/08* | (2006.01) | |
| *C08F 220/18* | (2006.01) | |
| *C09D 133/12* | (2006.01) | |

(52) U.S. Cl.
CPC ...... *C09D 133/08* (2013.01); *C08F 220/1802* (2020.02); *C09D 133/12* (2013.01)

(58) Field of Classification Search
CPC ... C08F 220/06; C08F 220/18; C08F 220/286
See application file for complete search history.

(56) References Cited

U.S. PATENT DOCUMENTS

| | | | |
|---|---|---|---|
| 5,108,654 A | 4/1992 | Ragaini | |
| 7,335,235 B2 | 2/2008 | Ruland et al. | |
| 7,790,800 B2 | 9/2010 | Suau et al. | |
| 8,791,199 B2 | 7/2014 | Suau et al. | |
| 8,877,681 B2 | 11/2014 | Berghaus et al. | |
| 2004/0072943 A1* | 4/2004 | Morihiro | F16F 9/38 524/556 |
| 2006/0270563 A1 | 11/2006 | Yang et al. | |
| 2008/0103248 A1 | 5/2008 | Suau et al. | |
| 2010/0273683 A1 | 10/2010 | Yang et al. | |
| 2011/0213071 A1* | 9/2011 | Suau | C08F 283/065 524/558 |
| 2011/0213072 A1* | 9/2011 | Suau | C08F 220/1802 524/558 |
| 2011/0218295 A1* | 9/2011 | Nguyen Kim | C08F 26/10 524/548 |
| 2012/0116005 A1 | 5/2012 | Yang et al. | |
| 2012/0116040 A1 | 5/2012 | Yang et al. | |
| 2012/0121523 A1 | 5/2012 | Yang et al. | |
| 2012/0123149 A1 | 5/2012 | Yang et al. | |
| 2013/0129647 A1 | 5/2013 | Yang et al. | |
| 2013/0296516 A1 | 11/2013 | Yang et al. | |
| 2014/0099276 A1 | 4/2014 | Yang et al. | |
| 2014/0178325 A1 | 6/2014 | Martinez-Castro et al. | |
| 2014/0235809 A1* | 8/2014 | Jarvis | C08F 220/06 526/318.2 |

FOREIGN PATENT DOCUMENTS

| | | |
|---|---|---|
| DE | 102 18 752 A1 | 11/2003 |
| DE | 202017005943 U1 * | 2/2018 |
| WO | WO 2013/064761 A1 | 5/2013 |

OTHER PUBLICATIONS

Machine translation into English of DE-202017005943-U1, BASF. (Year: 2018).*
Machine translation into English of DE 202017005943 U1; Feb. 2018 (Year: 2018).*
Extended European Search Report dated Oct. 6, 2017 in European Patent Application No. 17170477.8, 4 pages.
Beller, M., et al., "Progress in hydroformylation and corbonylation", Journal of Molecular Catalysis A: Chemical, vol. 104 Issue 1, Dec. 5, 1995, pp. 17-85.
Canselier, J.P., et al., "Ultrasound Emulsification—An Overview", Journal of Dispersion Science and Technology, vol. 23, Issue 1-3, 2002, pp. 333-349 (with cover page).
Jenkins, et al., "Chapter 23—Influence of Alkali-Soluble Associative Emulsion Polymer Architecture on Rheology", Hydrophilic Polymers, Advances in Chemistry, vol. 248, Jan. 15, 1996, pp. 425-447.
O'Connor, C.T., et al., "Alkene oligomerization", Catalysis Today, vol. 6, Issue 3, Jan. 1990, pp. 329-349.
Wu, W., et al., "Tailoring HASE rheology through polymer design: Effects of hydrophobe size, acid content, and molecular weight", Journal of Coatings Technology and Research, vol. 2, Issue 6, Apr. 2005, pp. 423-433.
International Search Report dated May 4, 2018 in PCT/EP2018/057896 filed on Mar. 28, 2018.

* cited by examiner

*Primary Examiner* — Karuna P Reddy
(74) *Attorney, Agent, or Firm* — Faegre Drinker Biddle & Reath LLP

(57) ABSTRACT

The presently claimed invention relates to polymer with branched structure, in particular, hydrophobically modified alkali-soluble (or alkali-swellable) emulsion (HASE) copolymers which are effective thickeners at high shear rates and at the same time offer a Newtonian rheology profile and their use in aqueous compositions, particularly in aqueous coating formulations as well as a method for preparing hydrophobically modified alkali-soluble (or alkali-swellable) emulsion copolymers.

38 Claims, No Drawings

POLYMER WITH BRANCHED STRUCTURE

The presently claimed invention relates to polymer with branched structure, in particular, hydrophobically modified alkali-soluble (or alkali-swellable) emulsion (HASE) copolymers which are effective thickeners at high shear rates and at the same time offer a Newtonian rheology profile and their use in aqueous compositions, particularly in aqueous coating formulations as well as a method for preparing hydrophobically modified alkali-soluble (or alkali-swellable) emulsion co-polymers.

BACKGROUND OF THE INVENTION

It is state of the art for paints and coatings to use HASE polymers as rheology modifier additives. Such additives are added to paint formulations at low dosage to adjust and control the rheological properties of a paint.

HASE modifiers are dispersions of water insoluble acrylic polymers in water. Once the pH is raised to pH>7 (eg. by addition to a paint) acidic groups on polymer chains are neutralized to make them water soluble. In addition to the acidic groups distributed throughout the polymer chains, they also have long chain hydrophobic groups. The hydrophobic modifications can associate with each other or on an intra-molecular basis or in combination with other hydrophobic materials like binders or dispersants in a coating formulation.

The rheology of HASE polymer as a function of shear rate is of tremendous practical interest to a paint formulator. The application of shear forces causes the disruption of hydrophobic junctions, resulting in viscosity drop commonly referred to as shear thinning phenomenon. A coating chemist is concerned with the rheology of formulated paints over a wide range of shear rates representative of eg. storage and application conditions.

With every change in shear rate, paint undergoes a change in viscosity whereby a higher shear rate leads to a lower viscosity. To better understand how a paint behaves at different shear rates, three different types of viscosity measurements reflecting the low, medium and high shear rate regions are considered. Low shear conditions are typically experienced by the paint while it is in the can and immediately after it has been applied to the wall. During these phases, sufficient low shear viscosity is needed to resist pigment settling and film sag but providing the required levelling of the applied paint film. Medium shear conditions are created during paint stirring and pouring and some types of pumping. During this phase, medium shear viscosity helps to facilitate good in-can appearance and handling properties and may also affect spattering. High shear processes include brushing, certain aspects of rolling and spraying. High shear viscosity influences brush and roller drag, as well as film build and thus contributes to hiding. High shear viscosity is often measured using a cone-plate viscometer including the standard ICI viscometer. Therefore, rheology modifiers which offer a good high shear viscosity are often referred to as "ICI builders" or "high shear builders".

The shear dependent paint properties such as low shear viscosity and high shear viscosity are related to coating performance. Aqueous coating formulations are dependent on the use of rheology modifiers for achieving required balance for market applications. Generally, a combination of modifiers is provided to provide a balance between container viscosity, application viscosity, anti-settling properties, spatter resistance, flow and levelling properties.

HASE polymers typically comprise minimum three types of monomers: 1) (meth)acrylic acid, 2) a non-ionic monomer of low water solubility which is suitable for emulsion polymerization and 3) an associative macromonomer comprising a hydrophobic group.

Despite the fact, that HASE polymers are commercially used since many years and many studies (e.g. Jenkins et al., ACS Advances in Chem Series, 248, pages 425-447, 1996; Wu et al., J. Coat. Technol, Res, 6, pages 423-433, 2005) investigated the influence of the polymer design on rheology characteristics, it is still an unmet challenge to design HASE with good high shear efficiency and a rather Newtonian rheology profile. Apart from the molecular weight and chemical composition, it has been demonstrated that the detailed structure of the hydrophobe group has a complex and not well understood influence on overall rheology behavior of a HASE polymers. This holds especially true for a paint formulation, which is a complex mixture of many components which partly interact with the rheology modifier. Both Jenkins and Wu could only generally conclude, that higher molar volume hydrophobes (e.g $R'=C_{18}$ or larger) tend to give high efficiency HASE with strongly shear thinning rheology profile, i.e. it cannot be expected to deliver the desired highly Newtonian rheology. Contrary to that one would expect that hydrophobes of lower molar volume could provide a more Newtonian profile, however with lower thickening efficiency at high shear rates.

U.S. Pat. No. 8,791,199 B2 provides a HASE type rheology modifier containing an associative monomer which is functionalised by a hydrophobic group (R') of an oxo alcohol which comprises a mixture of linear and branched alcohols of the structure: $CH_3—(CH_2)_p—CH(CH_2)_rCH_3—(CH_2)_q—OH$. The associative monomer of U.S. Pat. No. 8,791,199 B2 has only one branching point (and two alkyl branches) in the hydrophobic group (R'), i.e. is monobranched.

U.S. Pat. No. 7,790,800 B2 provides a water soluble acrylic copolymer with oxyalkylated monomer having a hydrophobic branched chain with 12 to 24 carbon atoms and having 2 branches each having at least 6 carbon atoms. The associative monomer of U.S. Pat. No. 8,791,199 B2 is also monobranched, i.e. has only one branching point.

Thus, it is general state of the art that HASE rheology modifiers can be based on associative macromonomers with monobranched hydrophobes. Such HASE polymers are described as giving advantage concerning the compatibility and viscosity stability versus pigment containing colorants which are added to paints. But no mention is made if such HASE could also provide advantages concerning the thickening effect at very high shear rates while exhibiting a Newtonian rheology profile. There is an ongoing need for rheology modifier additives which are very effective to build viscosity at high shear rates, ie. at shear rate of 1000 $s^{-1}$ to 10000 $s^{-1}$, but at the same time do not lead to unwanted thickening effect at lower shear rates of 0.1 to 100 $s^{-1}$. Such rheology profile is called here Newtonian as opposed to the more common pseudoplastic, i.e shear-thinning rheology profile, which is typically displayed by common waterborne thickener polymers of high thickening efficiency. Newtonian HASE polymers with high thickening efficiency are desirable additives for paint formulators in order to allow to selectively adjust and control paint rheology at high shear rates with minimally impacting the lower shear rates.

Thus, it was an object of the presently claimed invention to provide a novel HASE copolymer which can be used in coating formulations as a rheology modifier for achieving high thickening efficiency at high shear rates and provide to a Newtonian rheology profile.

SUMMARY OF THE INVENTION

Surprisingly, it has been found that HASE copolymer having a monomer with the hydrophobe derived from $C_{10}$-$C_{15}$-alcohols with a mean degree of branching (iso-index) in the range from 1.5-3.5 exhibits high thickening efficiency at high shear rates and a Newtonian rheology profile of the coating formulations, thereby rendering the copolymer with better thickening efficiency at high shear rates which enable them to be employed for a wide range of applications in coating formulations such as, but not limited to paint, lacquer, varnish, paper coating, wood coating, adhesive, cosmetic formulation, detergent formulation, textile, drilling muds, plaster formulations, formulations for plasterboard, for hydraulic binders such as mortar formulations, formulations for ceramics and for leather.

Accordingly, the presently claimed invention is directed to a copolymer which is obtainable by reacting a mixture comprising:
(A) ≥30 wt.-% to ≤70 wt.-% of at least one ethylenically unsaturated monomer with a carboxylic function,
(B) ≥30 wt.-% to ≤70 wt.-% of at least one non-ionic ethylenically unsaturated monomer,
(C) ≥1 wt.-% to ≤40 wt.-% of at least one monomer of formula (I)

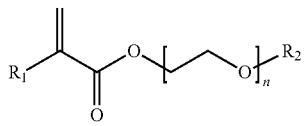

wherein
$R_1$ denotes hydrogen or methyl,
n is a real number in the range of ≥10 to ≤80, and
$R_2$ denotes branched, unsubstituted $C_{10}$-$C_{15}$alkyl,
(D) ≥0 wt.-% to ≤1 wt.-% of at least one crosslinking reagent,
(E) ≥0 wt.-% to ≤10 wt.-% of at least one ethylenically unsaturated monomer which is different from (A), (B) and (C),
(F) ≥0 wt.-% to ≤1 wt.-% of at least one chain transfer agent, and
wherein wt.-% is based on the total weight of the mixture, characterized in that the $C_{10}$-$C_{15}$ alkyl has a mean degree of branching (iso-index) in the range of ≥1.5 to ≤3.5.

In an embodiment of the presently claimed invention, the $C_{10}$-$C_{15}$ alkyl has a mean degree of branching (iso-index) in the range of ≥1.8 to ≤2.8.

In another embodiment of the presently claimed invention, the $C_{10}$-$C_{15}$ alkyl has a mean degree of branching (iso-index) in the range of ≥2 to ≤2.5.

In an embodiment of the presently claimed invention, $R_2$ denotes branched, unsubstituted $C_{12}$-$C_{15}$ alkyl.

In an embodiment of the presently claimed invention, the $C_{12}$-$C_{15}$ alkyl has a mean degree of branching (iso-index) in the range of ≥1.8 to ≤2.8.

In another embodiment of the presently claimed invention, the $C_{10}$-$C_{15}$ alkyl has a mean degree of branching (iso-index) in the range of ≥2 to ≤2.5.

In an embodiment of the presently claimed invention, $R_1$ denotes methyl.

In an embodiment of the presently claimed invention, the at least one ethylenically unsaturated monomer with a carboxylic function (A) is provided in an amount of ≥33 wt.-% to ≤67 wt.-%.

In another embodiment of the presently claimed invention, the at least one ethylenically unsaturated monomer with a carboxylic function (A) is provided in an amount of ≥36 wt.-% to ≤64 wt.-%.

In an embodiment of the presently claimed invention, the at least one non-ionic ethylenically unsaturated monomer (B) is provided in an amount of ≥33 wt.-% to ≤67 wt.-%.

In another embodiment of the presently claimed invention, wherein the at least one non-ionic ethylenically unsaturated monomer (B) is provided in an amount of ≥40 wt.-% to ≤60 wt.-%.

In an embodiment of the presently claimed invention, the at least one non-ionic ethylenically unsaturated monomer (B) is a mixture of at least two different non-ionic ethylenically unsaturated monomers (B).

In an embodiment of the presently claimed invention, the at least two different non-ionic ethylenically unsaturated monomers (B) are provided in an amount of ≥30 wt.-% to ≤70 wt.-%.

In another embodiment of the presently claimed invention, the at least two different non-ionic ethylenically unsaturated monomers (B) are provided in an amount of ≥33 wt.-% to ≤67 wt.-%.

In another embodiment of the presently claimed invention, the at least two different non-ionic ethylenically unsaturated monomers (B) are provided in an amount of ≥40 wt.-% to ≤60 wt.-%.

In an embodiment of the presently claimed invention, the at least one monomer (C) is a mixture of at least two different monomers of formula (I).

In an embodiment of the presently claimed invention, the at least one monomer (C) of formula (I) is provided in an amount of ≥8 wt.-% to ≤30 wt.-%.

In another embodiment of the presently claimed invention, the at least one monomer (C) of formula (I) is provided in an amount of ≥8 wt.-% to ≤20 wt.-%.

In an embodiment of the presently claimed invention, the at least one crosslinking reagent (D) is provided in an amount of ≥0 wt.-% to ≤0.5 wt.-%.

In an embodiment of the presently claimed invention, the at least one monomer (E) is provided in an amount of ≥0 wt.-% to ≤5 wt.-%.

In an embodiment of the presently claimed invention, the at least one chain transfer agent (F) is provided in an amount of ≥0 wt.-% to ≤0.5 wt.-%.

In an embodiment of the presently claimed invention, the at least one ethylenically unsaturated monomer with a carboxylic function (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride.

In another embodiment of the presently claimed invention, the at least one ethylenically unsaturated monomer with a carboxylic function (A) is selected from the group consisting of acrylic acid, methacrylic acid, $C_1$ to $C_4$ monoesters of maleic or itaconic acids, and mixtures thereof.

In an embodiment of the presently claimed invention, the at least one non-ionic ethylenically unsaturated monomer (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, and vinylcaprolactam.

In another embodiment of the presently claimed invention, the at least one non-ionic ethylenically unsaturated monomer (B) is selected from the group consisting of methyl, ethyl, butyl or 2-ethyl-hexyl esters of acrylic and methacrylic acid.

In an embodiment of the presently claimed invention, in the at least one monomer (C) of formula (I) $R_1$ is a methyl and n is a real number in the range of $\geq 10$ to $\leq 60$.

In another embodiment of the presently claimed invention, in the at least one monomer (C) of formula (I) $R_1$ is a methyl and n is a real number in the range of $\geq 10$ to $\leq 50$.

In an embodiment of the presently claimed invention, the at least one crosslinking reagent (D) is selected from the group consisting of ethylene glycol diacrylate, ethylene glycol dimethacrylate, trimethylolpropanetriacrylate, trimethylolpropanetrimethacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid.

In an embodiment of the presently claimed invention, at least one ethylenically unsaturated monomer (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids.

In an embodiment of the presently claimed invention, at least one chain transfer agent (F) is selected from the group consisting of n-dodecyl mercaptan, n-decyl mercaptan, octyl mercaptan, 1,8-dimercapto-3,6-dioxaoctane, thiolactic acid and tert-dodecanthiol, 2-(ethylhexyl) thioglycolate and terpinolene.

In an embodiment of the presently claimed invention, the copolymer according to the present invention is obtainable by reacting a mixture comprising,
- (A) $\geq 30$ wt.-% to $\leq 70$ wt.-% of at least one ethylenically unsaturated monomer with a carboxylic function selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride,
- (B) $\geq 30$ wt.-% to $\leq 70$ wt.-% of at least one non-ionic ethylenically unsaturated monomer selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, and vinylcaprolactam,
- (C) $\geq 1$ wt.-% to $\leq 40$ wt.-% of at least one monomer of formula (I)

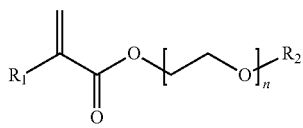

wherein
$R_1$ denotes hydrogen or methyl,
n is a real number in the range of $\geq 10$ to $\leq 80$, and
$R_2$ denotes branched, unsubstituted $C_{10}$-$C_{15}$ alkyl,
- (D) $\geq 0$ wt.-% to $\leq 1$ wt.-% of at least one crosslinking reagent selected from the group consisting of ethylene glycol diacrylate, ethylene glycol dimethacrylate, trimethylolpropanetriacrylate, trimethylolpropanetrimethacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid,
- (E) $\geq 0$ wt.-% to $\leq 10$ wt.-% of at least one ethylenically unsaturated monomer which is different from (A), (B), and (C), selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids,
- (F) $\geq 0$ wt.-% to $\leq 1$ wt.-% of at least one chain transfer agent selected from the group consisting of N-dodecyl mercaptan, n-decyl mercaptan, octyl mercaptan, 1,8-dimercapto-3,6-dioxaoctane, thiolactic acid and tert-dodecanthiol, 2-(ethylhexyl)thioglycolate and terpinolene, and wherein wt.-% is based on the total weight of the mixture, characterized in that the $C_{10}$-$C_{15}$ alkyl has a mean degree of branching (iso-index) in the range of $\geq 1.5$ to $\leq 3.5$.

In another embodiment of the presently claimed invention, the copolymer according to the present invention is obtainable by reacting a mixture comprising,
- (A) $\geq 30$ wt.-% to $\leq 70$ wt.-% of at least one ethylenically unsaturated monomer with a carboxylic function selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride,
- (B) $\geq 30$ wt.-% to $\leq 70$ wt.-% of at least two different non-ionic ethylenically unsaturated monomers selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, and vinylcaprolactam,
- (C) $\geq 1$ wt.-% to $\leq 40$ wt.-% of at least two different monomers of formula (I)

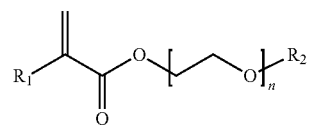

wherein
$R_1$ denotes hydrogen or methyl,
n is a real number in the range of $\geq 10$ to $\leq 80$, and
$R_2$ denotes branched, unsubstituted $C_{10}$-$C_{15}$ alkyl,
- (D) $\geq 0$ wt.-% to $\leq 1$ wt.-% of at least one crosslinking reagent selected from the group consisting of ethylene glycol diacrylate, ethylene glycol dimethacrylate, trimethylolpropanetriacrylate, trimethylolpropanetrimethacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid, (E) ≥0 wt.-% to ≤10 wt.-% of at least one ethylenically unsaturated monomer which is different from (A), (B), and (C), selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids, (F) ≥0 wt.-% to ≤1 wt.-% of at least one chain transfer agent selected from the group consisting of N-dodecyl mercaptan, n-decyl mercaptan, octyl mercaptan, 1,8-dimercapto-3,6-dioxaoctane, thiolactic acid and tert-dodecanthiol, 2-(ethylhexyl)thioglycolate and terpinolene, and wherein wt.-% is based on the total weight of the mixture, characterized in that the $C_{10}$-$C_{15}$ alkyl has a mean degree of branching (iso-index) in the range of ≥1.5 to ≤3.5.

In another embodiment of the presently claimed invention, the copolymer according to the present invention is obtainable by reacting a mixture comprising, (A) ≥36 wt.-% to ≤64 wt.-% of at least one ethylenically unsaturated monomer with a carboxylic function selected from the group consisting of acrylic acid, methacrylic acid, $C_1$ to $C_4$ monoesters of maleic or itaconic acids, (B) ≥40 wt.-% to ≤60 wt.-% of at least two different non-ionic ethylenically unsaturated monomers selected from the group consisting of methyl, ethyl, butyl or 2-ethyl-hexyl esters of acrylic and methacrylic acid, (C) ≥8 wt.-% to ≤30 wt.-% of at least two different monomers of formula (I)

$$R_1 \diagup \!\!\!\!\!\!\!\!\!\!= \!\!\!\!\!\!\!\!\!\!\diagdown C(O)-O-[CH_2CH_2O]_n-R_2$$

wherein
$R_1$ denotes methyl,
n is a real number in the range of ≥10 to ≤60, and
$R_2$ denotes branched, unsubstituted $C_{12}$-$C_{15}$ alkyl, (D) ≥0 wt.-% to ≤0.5 wt.-% of at least one crosslinking reagent selected from the group consisting of ethylene glycol diacrylate, ethylene glycol dimethacrylate, trimethylolpropanetriacrylate, trimethylolpropanetrimethacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid, (E) ≥0 wt.-% to ≤5 wt.-% of at least one ethylenically unsaturated monomer which is different from (A), (B), and (C), selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids, (F) ≥0 wt.-% to ≤0.5 wt.-% of at least one chain transfer agent selected from the group consisting of N-dodecyl mercaptan, n-decyl mercaptan, octyl mercaptan, 1,8-dimercapto-3,6-dioxaoctane, thiolactic acid and tert-dodecanthiol, 2-(ethylhexyl)thioglycolate and terpinolene, and wherein wt.-% is based on the total weight of the mixture, characterized in that the $C_{12}$-$C_{15}$ alkyl has a mean degree of branching (iso-index) in the range of ≥1.8 to ≤2.8.

In another aspect of the presently claimed invention, a method for manufacturing the copolymer according to the present invention has been provided, the method comprises copolymerizing in a liquid medium a monomer mixture comprising:

(A) ≥30 wt.-% to ≤70 wt.-% of at least one ethylenically unsaturated monomer with a carboxylic function,
(B) ≥30 wt.-% to ≤70 wt.-% of at least one non-ionic ethylenically unsaturated monomer,
(C) ≥1 wt.-% to ≤40 wt.-% of at least one monomer of formula (I), and $$R_1 \diagup \!\!\!\!\!\!\!\!\!\!= \!\!\!\!\!\!\!\!\!\!\diagdown C(O)-O-[CH_2CH_2O]_n-R_2$$

wherein
$R_1$ denotes hydrogen or methyl,
n is a real number in the range of ≥10 to ≤80, and
$R_2$ denotes branched, unsubstituted $C_{10}$-$C_{15}$ alkyl, and
(E) ≥0 wt.-% to ≤10 wt.-% at least one ethylenically unsaturated monomer which is different from (A), (B), and (C).

In an embodiment according the presently claimed invention the liquid medium comprises water, surfactants, crosslinking reagent, chain transfer agent and an initiator.

Yet another aspect of the presently claimed invention provides use of the copolymer according to the present invention in aqueous compositions as a thickener for coating formulations for achieving high thickening efficiency at high shear rates and a Newtonian rheology profile of the formulations.

Yet another aspect of the presently claimed invention provides an aqueous composition in the form of a coating formulation, which comprises ≥0.01 wt.-% to ≤10 wt.-%, based on the total weight of the aqueous composition, the copolymer of the present invention and ≥15 wt.-% to 99.9≤wt.-%, based on the total weight of the aqueous composition of at least one of the components, selected from the group consisting of pigments, fillers, binders, solvents, defoamers, neutralising agent, wetting agent, pigment dispersing agents, and water.

In an embodiment of the presently claimed invention, the aqueous composition is a paint, lacquer, varnish, paper coating, wood coating, adhesive, cosmetic formulation, detergent formulation, textile, drilling muds, plaster formulations, formulations for plasterboard, for hydraulic binders such as mortar formulations, formulations for ceramics and for leather.

In an embodiment of the presently claimed invention, copolymer according to the present invention is obtainable by reacting a mixture consisting of:

(A) ≥30 wt.-% to ≤70 wt.-% of at least one ethylenically unsaturated monomer with a carboxylic function, (B) ≥30 wt.-% to ≤70 wt.-% of at least one non-ionic ethylenically unsaturated monomer, (C) ≥1 wt.-% to ≤40 wt.-% of at least one monomer of formula (I)

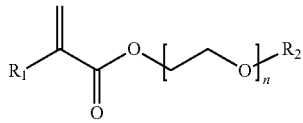

wherein
$R_1$ denotes hydrogen or methyl,
n is a real number in the range of ≥10 to ≤80, and
$R_2$ denotes branched, unsubstituted $C_{10}$-$C_{15}$ alkyl, (D) ≥0 wt.-% to ≤1 wt.-% of at least one crosslinking reagent, (E) ≥0 wt.-% to ≤10 wt.-% of at least one ethylenically unsaturated monomer which is different from (A), (B), and (C), (F) ≥0 wt.-% to ≤1 wt.-% of at least one chain transfer agent, and wherein wt.-% is based on the total weight of the mixture, characterized in that the $C_{10}$-$C_{15}$ alkyl has a mean degree of branching (iso-index) in the range of ≥1.5 to ≤3.5.

In an embodiment of the presently claimed invention, the $C_{10}$-$C_{15}$ alkyl has a mean degree of branching (iso-index) in the range of ≥1.8 to ≤2.8.

DETAILED DESCRIPTION OF THE INVENTION

The presently claimed invention is directed to a HASE copolymer which acts as an effective thickener at high shear rates and creates a Newtonian rheology profile in aqueous coating formulations. The copolymer comprises at least one ethylenically unsaturated monomer with a carboxylic function (A), at least one non-ionic ethylenically unsaturated monomer (B), at least one monomer (C) of formula (I) which is an oxyalkylated monomer with ethylenic unsaturation and terminated by a hydrophobic branched unsubstituted $C_{10}$-$C_{15}$ alkyl chain having a mean degree of branching (iso-index) in the range of ≥1.5 to ≤3.5, optionally, at least one crosslinking reagent (D), optionally, at least one ethylenically unsaturated monomer (E) which is different from (A), (B), (C) and (D), and optionally at least one chain transfer agent (F).

Accordingly, the presently claimed invention is directed to a copolymer which is obtainable by reacting a mixture comprising:

(A) ≥30 wt.-% to ≤70 wt.-% of at least one ethylenically unsaturated monomer with a carboxylic function, (B) ≥30 wt.-% to ≤70 wt.-% of at least one non-ionic ethylenically unsaturated monomer, (C) ≥1 wt.-% to ≤40 wt.-% of at least one monomer of formula (I)

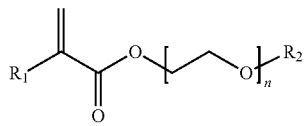

wherein
$R_1$ denotes hydrogen or methyl,
n is a real number in the range of ≥10 to ≤80, and
$R_2$ denotes branched, unsubstituted $C_{10}$-$C_{15}$ alkyl, (D) ≥0 wt.-% to ≤1 wt.-% of at least one crosslinking reagent, (E) ≥0 wt.-% to ≤10 wt.-% of at least one ethylenically unsaturated monomer which is different from (A), (B), and (C), (F) ≥0 wt.-% to ≤1 wt.-% of at least one chain transfer agent, and wherein wt.-% is based on the total weight of the mixture, characterized in that the $C_{10}$-$C_{15}$ alkyl has a mean degree of branching (iso-index) in the range of ≥1.5 to ≤3.5.

The term "thickener" as used herein shall be understood to mean a compound which when added, increases the viscosity of the composition, in particular the viscosity at a high shear rate (1000 $s^{-1}$ to 10000 $s^{-1}$).

When the copolymer of the presently claimed invention having a monomer (C) of formula (I) with $C_{10}$-$C_{15}$ alkyl having a mean degree of branching (iso-index) in the range from 1.5-3.5 is used as a thickener, it imparts the desired thickening effect. By "desired thickening effect" it is meant that it exhibits high thickening efficiency at high shear rates, i.e. at shear rate of 1000 $s^{-1}$ to 10000 $s^{-1}$, but at the same time does not lead to unwanted thickening effect at low shear rates of 0.1 to 100 $s^{-1}$ thereby creating a Newtonian rheology profile. For aqueous compositions in form of coating formulations, ≥0.01 wt.-% to ≤10 wt.-% based on total weight of the aqueous composition, of the copolymer of the presently claimed invention is added to obtain the desired thickening effect.

The term "branched" denotes a chain of atoms with one or more side chains attached to it. Branching occurs by the replacement of a substituent, e.g. a hydrogen atom, with a covalently bonded alkyl radical.

The term "alkyl" denotes a saturated moiety constituted solely of atoms of carbon and of hydrogen.

Preferably in the copolymer according to the presently claimed invention, as described hereinabove, at least one ethylenically unsaturated monomer with a carboxylic function (A) is present, preferably in an amount ≥30 wt.-% to ≤70 wt.-% or in an amount ≥33 wt.-% to ≤67 wt.-%, more preferably in an amount of ≥36 wt.-% to ≤64 wt.-% or in an amount of ≥36 wt.-% to ≤55 wt.-% or in an amount of ≥38 wt.-% to ≤55 wt.-%, most preferably in an amount of ≥38 wt.-% to ≤50 wt.-%, or in an amount of ≥38 wt.-% to ≤45 wt.-%, based on total weight of the mixture.

Preferably, the copolymer according to the presently claimed invention has an average molecular weight of ≥10000 g/mol to ≤3000000 g/mol.

In an embodiment of the presently claimed invention, the at least one non-ionic ethylenically unsaturated monomer (B) is a mixture of at least two different non-ionic ethylenically unsaturated monomers (B). For example, monomer (B) is a mixture of ethyl, butyl or 2-ethyl-hexyl esters of acrylic and methacrylic acid, acrylonitrile, vinyl acetate, styrene, methylstyrene, diisobutylene, vinylpyrrolidone and vinylcaprolactam.

In an embodiment of the presently claimed invention, the at least one monomer (C) is a mixture of at least two different monomers of formula (I). For example, monomer (C) is a mixture of different monomers comprising $C_{10}$ to $C_{15}$ alkyl having a mean degree of branching (iso-index) in the range of ≥1.5 to ≤3.5.

In an embodiment of the presently claimed invention, the hydrophobic branched chain is derived from $C_{10}$-$C_{15}$ alcohols having a mean degree of branching (iso-index) in the range of ≥1.5 to ≤3.5.

In another embodiment of the presently claimed invention, the hydrophobic branched chain is derived from $C_{12}$-$C_{13}$ alcohols having a mean degree of branching (iso-index) in the range of ≥1.5 to ≤3.5.

Such branched alcohols from commercial sources are typically not molecular uniform compounds, but consist of a complex mixtures of isomers, depending on the technical manufacturing process. They can therefore not be described by a single chemical formula, but can best be described by the C-length distribution and the Iso-Index "Ix".

The mean degree of branching (iso-index) of the monomer (C) of formula (I) is essential to the invention since a mean degree of branching (iso-index) in the range from 1.5-3.5 imparts the desired thickening effect to the coating formulation. In the context of the present invention, the mean degree of branching is generally defined as the number of methyl groups in a molecule of the alcohol minus 1. The mean degree of branching is the statistical mean of the degrees of branching of the molecules of a sample.

The mean degree of branching can be determined by $^1$H-NMR spectroscopy as follows: A sample of the alcohol or alcohol mixture, for instance the $C_{12}$ alcohol or the $C_{12}$/$C_{13}$ alcohol mixture, is first subjected to a derivatization with trichloroacetyl isocyanate (TAI). This converts the alcohols to the carbamic esters.

The signals of the primary alcohols esterified in this way are at δ=4.7 to 4.0 ppm, those of esterified secondary alcohols (where present) at about 5 ppm, and water present in the sample reacts with TAI to give the carbamic acid. All methyl, methylene and methine protons are in the range from 2.4 to 0.4 ppm. The signals <1 ppm are assigned to the methyl groups. From the spectrum thus obtained, it is possible to calculate the mean degree of branching (iso index) as follows:

iso index=((F(CH$_3$)/3)/(F(CH$_2$OH)/2))−1 where F(CH$_3$) is the signal area corresponding to the methyl protons and F(CH$_2$OH) is the signal area of the methylene protons in the CH$_2$OH group.

U.S. Pat. No. 7,335,235 provides a process for the preparation of the alkoxylate mixtures by reacting alkanols with alkylene oxides, under alkoxylation conditions, in the presence of a catalyst. Preferably the alcohol, more preferably the $C_{10}$-$C_{15}$ alcohols having a mean degree of branching (iso-index) in the range of ≥1.5 to ≤3.5, and KOH (finely powdered) are mixed and dewatered at 80° C. and 40 mbar for 1 hour. The reaction product is placed into an autoclave, the autoclave is preferably rendered inert by flushing twice with nitrogen and is then heated to 120° C. Over the course of 15 minutes, ethylene oxide is metered in to a maximum pressure of 1 bar. This pressure is held for 5 min, then increased by adding ethylene oxide over the course of 60 minutes to 3 bar, this pressure is held for 5 hours and, finally, the pressure is increased to 6 bar. In the case of the last metered addition, only enough ethylene oxide is added until the amount of ethylene oxide given below is reached. The pressure is then held at 6 bar through the metered addition of nitrogen. After a reaction time of a further 10 hours, the system is left to cool to room temperature and the reaction product is removed. Volatile components are removed on a rotary evaporator at 30 mbar and 80° C.

In a preferred embodiment, the alcohol alkoxylates to be used are based on $C_{13}$-oxo alcohols. The term "$C_{13}$-oxo alcohol" refers to an alcohol mixture whose main component is formed by at least one branched $C_{13}$-alcohol (isotridecanol). Such $C_{13}$-alcohols include, in particular, tetramethylnonanols, for example 2,4,6,8-tetramethyl-1-nonanol or 3,4,6,8-tetramethyl-1-nonanol and furthermore ethyldimethylnonanols such as 5-ethyl-4,7-dimethyl-1-nonanol.

The general procedure to obtain $C_{13}$-alcohol mixtures has been provided in U.S. Pat. No. 8,877,681. It is mentioned in U.S. Pat. No. 8,877,681 that suitable $C_{13}$-alcohol mixtures can generally be obtained by hydrogenation of hydroformylated trimeric butene. In particular, it is possible to proceed as follows:

a) butenes are brought into contact with a suitable catalyst for oligomerization, b) a $C_{12}$-olefin fraction is isolated from the reaction mixture, c) the $C_{12}$-olefin fraction is hydroformylated by reaction with carbon monoxide and hydrogen in the presence of a suitable catalyst, and d) hydrogenated.

The butene trimerization (process step a) can be carried out with homogeneous or heterogeneous catalyst. Butenes are oligomerized in a homogeneous phase in the presence of a catalyst system comprising a transition metal derivative and an organometallic compound. Typical catalyst systems are Ni(O) complexes in combination with Lewis acids such as AlCl$_3$, BF$_3$, SbF$_5$ and the like, or Ni(II) complexes in combination with alkylaluminum halides. However, it is also possible to oligomerize butenes in the manner known per se using a heterogeneous nickel-containing catalyst (process step a). Depending on the selected reaction conditions, different relative amounts of butene dimers, trimers and higher oligomers are obtained. The butene trimers, i.e. $C_{12}$-olefins, are further processed for the present purposes. The isobutene content may be selected with a view to the desired degree of branching of the $C_{13}$-alcohol mixture obtained after the hydroformylation/hydrogenation. Relatively low degrees of branching require a relatively low isobutene content and vice versa. If, for example, the $C_{12}$-olefin fraction is to have an Iso-index of approximately 1.9 to 2.3, it is expedient to select predominantly linear butenes, i.e. the hydrocarbon stream which is generally employed should contain less than 5% by weight of isobutene based on the butene fraction. The butenes may contain an admixture of saturated $C_4$-hydrocarbons, which act as diluent in the oligomerization process. The heterogeneous nickel-containing catalysts which may be used can have different structures, with catalysts containing nickel oxide being preferred. Catalysts which are known are described in C. T. O'Connor et al., Catalysis Today, vol. 6 (1990), pp. 336-338 are suitable.

Starting with the material obtained in the oligomerization reaction, a $C_{12}$-olefin fraction is isolated in one or more separation steps (process step b).

The Iso-index of the $C_{12}$-olefin fraction, which indicates the mean degree of branching, is generally from 1.5 to 3.5, preferably 1.8 to 2.8, more preferably 2 to 2.5. The iso index can be determined by the general procedure as discussed above.

To prepare an alcohol mixture according to the invention, the $C_{12}$-olefin fraction which has been isolated is hydroformylated to give $C_{13}$-aldehydes (process step c), and these are subsequently hydrogenated to form $C_{13}$-alcohols (process step d). The preparation of the alcohol mixture can be carried out in a single step or in two separate reaction steps.

An overview of hydroformylation processes and suitable catalysts can be found in Beller et al., Journal of Molecular Catalysis A 104 (1995), pp. 17-85.

The hydroformylation is preferably carried out in the presence of a cobalt hydroformylation catalyst.

The crude aldehydes or aldehyde/alcohol mixtures obtained in the hydroformylation can, if desired, be isolated before hydrogenation by customary methods known to the skilled worker and, if appropriate, purified.

For the hydrogenation, the reaction mixtures obtained in the hydroformylation are reacted with hydrogen in the presence of hydrogenation catalysts. Suitable hydrogenation catalysts are generally transition metals such as, for example, Cr, Mo, W, Fe, Rh, Co, Ni, Pd, Pt, Ru and the like or mixtures of these, which may be applied to supports such as active charcoal, aluminum oxide, kieselguhr and the like, to increase activity and stability.

In theory, a "Newtonian" rheology profile signifies that the viscosity remains independent of the shearing gradient, however, such properties are believed impossible in polymer reality. Thus, in conventional practice, the skilled man in the art associates such a "Newtonian" profile with a low degree of change of viscosity depending on the shearing rate (rheogram proportionately flatter), in contrast to a pseudoplastic rheology profile, characterised by a marked fall in the viscosity depending on this gradient (rheogram proportionately more sloping). In tangible terms, the lower the ratio between the low shear viscosity at 1 $s^{-1}$, in mPas, and the high shear viscosity known as the "ICI" (which corresponds approximately to a shear rate of 10000 $s^{-1}$), the closer one comes to a Newtonian behaviour.

The copolymer of the presently claimed invention is obtained by the copolymerisation techniques well known to the skilled man in the art, such as the techniques of radical copolymerisation in solution, in a direct or reverse emulsion polymerization, in suspension, or precipitation in appropriate solvents, in the presence of catalytic systems and known chain transfer agents.

In an embodiment of the presently claimed invention, a method for manufacturing the copolymer according to the present invention has been provided, the method comprises copolymerizing in a liquid medium a monomer mixture comprising:

(A) ≥30 wt.-% to ≤70 wt.-% at least one ethylenically unsaturated monomer with a carboxylic function, (B) ≥30 wt.-% to ≤70 wt.-% at least one non-ionic ethylenically unsaturated monomer, (C) ≥1 wt.-% to ≤40 wt.-% at least one monomer of formula (I), and

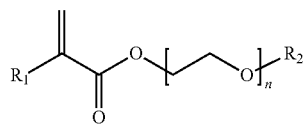

wherein
R$_1$ denotes hydrogen or methyl,
n is a real number in the range of ≥10 to ≤80, and
R$_2$ denotes branched, unsubstituted $C_{10}$-$C_{15}$alkyl, and (E) ≥0 wt.-% to ≤5 wt.-% at least one ethylenically unsaturated monomer which is different from (A), (B), and (C).

In an embodiment according the presently claimed invention the liquid medium comprises water, surfactants, crosslinking reagent, chain transfer agent and an initiator.

Surfactant

Surfactants which are preferably used for preparing the copolymer according to the present invention are selected from ionic surfactants and non-ionic surfactants, more specifically, anionic surfactants, for example, alcohol sulfates, alcohol ether sulfates, alkylbenzenesulfonates, α-olefinsulfonates, sulfosuccinates, and cationic surfactants, for example, $C_8$ to $C_{16}$-dialkyldimethylammonium salts, dialkoxydimethylammonium salts or imidazolinium salts with a long-chain alkyl radical. Non-ionic surfactants used are generally known in the art, preferably for example, ethoxylated fatty alcohols, ethoxylated alkylphenols and alkylpolyglycosides. For example, WO2013064761 provides polyglycerol as surfactant in the polymerization process for preparing acrylic associative thickener.

Crosslinking Reagent

Crosslinking reagent is preferably selected from the group consisting of ethylene glycol diacrylate, ethylene glycol dimethacrylate, trimethylolpropanetriacrylate, trimethylolpropanetrimethacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid.

Chain Transfer Agent

Chain transfer agent is preferably selected from the group consisting of N-dodecyl mercaptan, n-decyl mercaptan, octyl mercaptan, 1,8-dimercapto-3,6-dioxaoctane, thiolactic acid and tert-dodecanthiol, 2-(ethylhexyl)thioglycolate and terpinolene.

Initiator

The radical emulsion polymerization is preferably initiated by a radical initiator, i.e. a compound, which, on exposure to heat or light, decomposes and forms free radicals, which triggers a radical polymerization of the ethylenically unsaturated monomers The initiators that are suitable for the emulsion polymerization of the invention are the polymerization initiators which are suitable and used typically for an emulsion polymerization, and which trigger free-radical polymerization of the monomers These initiators include azo compounds such as 2,2'-azobisisobutyronitrile, 2,2'-azobis(2-methyl-butyro-nitrile), 2,2'-azobis(2,4-dimethylvaleronitrile), 2,2'-azobis(4-methoxy-2,4-dimethylvalero-nitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N, N'-dimethyleneisobutyramidine), free base or hydrochloride, 2,2'-azobis(2-amidinopropane), free base or hydrochloride, 2,2'-azobis{2-methyl-N-[1,1-bis (hydroxy-methyl)ethyl]propionamide} or 2,2'-azobis{2-methyl-N[1,1-bis(hydroxymethyl)-2-hydroxyethyl]propionamide;

organic peroxides or hydroperoxides such as acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, di-acetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethyl-cyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, [alpha], [alpha]'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-[alpha]-hydroperoxide, cumene hydroperoxide, t-butyl hydroperoxide and diisopropyl peroxidicarbamate, inorganic peroxides and hydroperoxides such as $H_2O_2$ and salts of peroxodisulfuric acid such as sodium peroxodisulfate, and redox initiator systems, which comprise an oxidizing agent, e.g. one or more of the aforementioned organic or inorganic peroxides or hydroperoxides and a reducing agent, e.g. a sulfur compound which more particularly is selected from sodium hydrogen sulfite, sodium hydroxymethanesulfinate, and the adduct of hydrogen sulfite with acetone, or ascorbic acid. Redox initiator systems may further comprise an addition of small amounts of redox metal salts such as iron salts, vanadium salts, copper salts, chromium salts or manganese salts, such as in the ascorbic acid/iron (II) sulfate sodium peroxodisulfate redox initiator system, for example.

It is preferred to use water-soluble initiators, examples being salts of peroxodisulfuric acid, more particularly sodium, potassium or ammonium salts, or a redox initiator system comprising as oxidizing agent a salt of peroxodisulfuric acid, hydrogen peroxide or an organic peroxide such as tert-butyl hydroperoxide. The reducing agents preferably comprise a sulfur compound which more particularly is selected from sodium hydrogen sulfite, sodium hydroxymethanesulfinate, and the adduct of hydrogen sulfite with acetone. Other suitable reducing agents are phosphorus-containing compounds such as phosphorous acid, hypophosphites, and phosphinates and also hydrazine or hydrazine hydrate, and ascorbic acid.

The initiator is used typically in an amount of ≥0.02% to ≤2%, and more particularly ≥0.05% to ≤1.5%, by weight, based on the overall amount of monomers at least one ethylenically unsaturated monomer with a carboxylic function (A), at least one non-ionic ethylenically unsaturated monomer (B), at least one monomer (C) of formula (I) and at least one ethylenically unsaturated monomer (E) which is different from (A), (B), and (C). The optimum amount of initiator is of course dependent on the initiator system used and can be determined by the skilled worker in routine experiments. Particularly, monomer (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride.

In an embodiment of the presently claimed invention aqueous composition in the form of a coating formulation, which comprises ≥0.01 wt.-% to ≤10 wt.-%, preferably, ≥0.1 wt.-% to ≤10 wt.-%, preferably, ≥0.3 wt.-% to ≤10 wt.-%, more preferably, ≥0.7 wt.-% to ≤10 wt.-%, based on the total weight of the aqueous composition, the copolymer according to the present invention, and ≥15 wt.-% to ≤99.9≤wt.-%, preferably, ≥30 wt.-% to ≤99.9≤wt.-%, more preferably, ≥50 wt.-% to 99≤wt.-%, based on the total weight of the aqueous composition of at least one of the components, selected from the group consisting of pigments, fillers, binders, solvents, defoamers, neutralising agent, wetting agent, pigment dispersing agents and water.

Additives

The choice of suitable conventional additives for the composition of the invention is dependent on the particular end use of the coating material formulations, and may be determined in an individual case by the skilled person. The following compounds are generally used as additives.

Pigments

Organic or inorganic pigments are suitable as additives. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Other examples of organic pigments can be found in the following monograph: W. Herbst, K. Hunger, "Industrielle Organische Pigmente", $2^{nd}$ edition, 1995, VCH Verlagsgesellschaft, ISBN: 3-527-28744-2. Examples of inorganic pigments are titanium dioxide, metallic flakes, such as aluminum and also aluminum oxide, iron (III) oxide, chromium (III) oxide, titanium (IV) oxide, zirconium (IV) oxide, zinc oxide, zinc sulfide, zinc phosphate, mixed metal oxide phosphates, molybdenum sulfide, cadmium sulfide, graphite, vanadates such as bismuth vanadate, chromates, such as lead (IV) chromates, molybdates such as lead (IV) molybdate, and mixtures thereof.

Fillers

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application. The fillers can be added in an amount of 1 to 75 wt. %, based on the total weight of the composition.

Binders

Suitable binders are the ones customarily used, for example the ones described in 30 Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying 35 resins can be used. Binders may also be derived from polyvinylalcohol and polyvinylbutyral. Binders include latex polymers made by emulsion polymerization. For architectural coatings especially preferred latex polymers are based on acrylic emulsion polymers, styrene-acrylic emulsion polymers, vinyl acetate-acrylic emulsion polymers or emulsion polymers based on ethylene and vinyl acetate. Preferably, the binder is present in the range of from 2 to 40 weight percent, more preferably in the range of from 5 to 30 weight percent, based on the weight of the paint composition.

Neutralizing Agent

Suitable neutralizing agents are inorganic bases, organic bases, and combinations thereof. Examples of inorganic bases include but are not limited to the alkali metal hydroxides (especially lithium, sodium, potassium, magnesium, and ammonium), and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol (2-Amino-2-methyl-1-propanol), dodecylamine, cocamine, oleamine, morpholine, triamylamine, triethylamine, tetrakis(hydroxypropyl)ethylenediamine, L-arginine, methyl glucamine, isopropylamine, aminomethyl propanol, tromethamine (2-amino 2-hydroxymethyl-1,3-propanediol), and PEG-15 cocamine. Alternatively, other alkaline materials can be used alone or in combination with the above mentioned inorganic and organic bases.

Other Rheology Modifiers

As is common in many application fields to combine different rheology modifiers, the inventive aqueous compositions like paints may contain non-inventive rheology additives in addition to the inventive HASE copolymer according to the presently claimed invention.

Depending on the intended use, the pigment composition may further comprise one or more conventional additives. Conventional additives included e.g. defoamers, wetting agents, pigment dispersing agents, pigment synergists, preservatives, and the like.

Preferred embodiments a to p of the copolymer of the presently claimed invention are summarized in the Table 1 to 4.

TABLE 1

| Component(s) | a | b | c | d |
|---|---|---|---|---|
| (A) at least one ethylenically unsaturated monomer with a carboxylic function | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof | (A) is selected from the group consisting of acrylic acid, methacrylic acid, $C_1$ to $C_4$ monoesters of maleic or itaconic acids, and mixtures thereof |
| (B) at least one non-ionic ethylenically unsaturated monomer | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam | (B) is selected from the group consisting of methyl, ethyl, butyl or 2-ethyl-hexyl esters of acrylic, and methacrylic acid | (B) is selected from the group consisting of methyl, ethyl, butyl or 2-ethyl-hexyl esters of acrylic, and methacrylic acid |
| (C) at least one monomer of formula (I) | Formula (I), wherein $R_1$ denotes hydrogen or methyl, n is a real number in the range of $\geq 10$ to $\leq 80$, $R_2$ denotes branched, unsubstituted $C_{10}$-$C_{15}$ alkyl, and $C_{10}$-$C_{15}$ alkyl has an iso-index in the range of $\geq 1.5$ to $\leq 3.5$ | Formula (I), wherein $R_1$ denotes hydrogen or methyl, n is a real number in the range of $\geq 10$ to $\leq 70$, $R_2$ denotes branched, unsubstituted $C_{10}$-$C_{15}$ alkyl, and $C_{10}$-$C_{15}$ alkyl has an iso-index in the range of $\geq 1.5$ to $\leq 3.5$ | Formula (I), wherein $R_1$ is methyl, n is a real number in the range of $\geq 10$ to $\leq 60$, $R_2$ denotes branched, unsubstituted $C_{10}$-$C_{15}$ alkyl, and $C_{10}$-$C_{15}$ alkyl has an iso-index in the range of $\geq 1.8$ to $\leq 2.8$ | Formula (I), wherein $R_1$ is methyl, n is a real number in the range of $\geq 10$ to $\leq 50$, $R_2$ denotes branched, unsubstituted $C_{10}$-$C_{15}$ alkyl, and $C_{10}$-$C_{15}$ alkyl has an iso-index in the range of $\geq 2$ to $\leq 2.5$ |
| Optionally, (D) at least one cross linking reagent | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of | (D) is selected from the group consisting of ethylene glycol diacrylate, ethylene glycol dimethacrylate, trimethylolpropane-triacrylate, trimethylolpropanetri-methacrylate, allyl acrylate, meth- | (D) is selected from the group consisting of ethylene glycol diacrylate, ethylene glycol dimethacrylate, trimethylolpropane-triacrylate, trimethylolpropanetri-methacrylate, allyl acrylate, meth- |

TABLE 1-continued

| Component(s) | a | b | c | d |
|---|---|---|---|---|
| | pentaerythritol, sorbitol, or sucrose or diallylester of phthalic acid | pentaerythritol, sorbitol, or sucrose or diallylester of phthalic acid | ylenebisacrylamide, methylenebismethacrylamide, tetrallyloxyethane, triallylcyanurates, and allylic ethers of pentaerythritol, sorbitol, or sucrose or diallylester of phthalic acid | ylenebisacrylamide, methylenebismethacrylamide, tetrallyloxyethane, triallylcyanurates, and allylic ethers of pentaerythritol, sorbitol, or sucrose or diallylester of phthalic acid |
| Optionally, (E) at least one ethylenically unsaturated monomer which is different from (A), (B), and (C) | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids |
| (F) optionally, at least one chain transfer agent | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, and 2-(ethylhexyl)thioglycolate | (F) is selected from the group consisting of n-dodecyl mercaptan, n-decyl mercaptan, octyl mercaptan, 1,8- dimercapto-3, 6-dioxaoctane and 2-(ethylhexyl)thioglycolate |

TABLE 2

| Component(s) | e | f | g | h |
|---|---|---|---|---|
| (A) at least one ethylenically unsaturated monomer with a carboxylic function | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof | (A) is selected from the group consisting of acrylic acid, methacrylic acid, $C_1$ to $C_4$ monoesters of maleic or itaconic acids, and mixtures thereof |
| (B) at least two different nonionic ethylenically unsaturated monomer (C) at least two different monomers of formula (1) | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam Formula (1), wherein $R_1$ denotes hydrogen or methyl, n is a real number in the range of $\geq 10$ to $\leq 80$, $R_2$ denotes branched, unsubstituted $C_{10}$-$C_{15}$ alkyl, and $C_{10}$-$C_{15}$ alkyl has an iso-index in the range of $\geq 1.5$ to $\leq 3.5$ | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam Formula (I), wherein $R_1$ denotes hydrogen or methyl, n is a real number in the range of $\geq 10$ to $\leq 70$, $R_2$ denotes branched, unsubstituted $C_{10}$-$C_{15}$ alkyl, and $C_{10}$-$C_{15}$ alkyl has an iso-index in the range of $\geq 1.5$ to $\leq 3.5$ | (B) is selected from the group consisting of methyl, ethyl, butyl or 2-ethylhexyl esters of acrylic, and methacrylic acid Formula (I), wherein $R_1$ is methyl, n is a real number in the range of $\geq 10$ to $\leq 60$, $R_2$ denotes branched, unsubstituted $C_{10}$-$C_{15}$ alkyl, and $C_{10}$-$C_{15}$ alkyl has an iso-index | (B) is selected from the group consisting of methyl, ethyl, butyl or 2-ethylhexyl esters of acrylic, and methacrylic acid Formula (I), wherein $R_1$ is methyl, n is a real number in the range of $\geq 10$ to $\leq 50$, $R_2$ denotes branched, unsubstituted $C_{10}$-$C_{15}$ alkyl, and $C_{10}$-$C_{15}$ alkyl has an iso-index |

TABLE 2-continued

| Component(s) | e | f | g | h |
|---|---|---|---|---|
| Optionally, (D) at least one cross linking reagent | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | in the range of ≥1.8 to ≤2.8 (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | in the range of ≥2 to ≤2.5 (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid |
| Optionally, (E) at least one ethylenically unsaturated monomer which is different from (A), (B), and (C) | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids |
| (F) optionally, at least one chain transfer agent | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto- 3, 6-dioxaoctane, and 2-(ethylhexyl)thioglycolate | (F) is selected from the group consisting of n-dodecyl mercaptan, n-decyl mercaptan, octyl mercaptan, 1,8- dimercapto- 3, 6-dioxaoctane, and 2-(ethylhexyl)thioglycolate |

TABLE 3

| Component(s) | i | j | k | l |
|---|---|---|---|---|
| (A) at least one ethylenically unsaturated monomer with a carboxylic function | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof | (A) is selected from the group consisting of acrylic acid, methacrylic acid, $C_1$ to $C_4$ monoesters of maleic or itaconic acids, and mixtures thereof |

TABLE 3-continued

| Component(s) | i | j | k | l |
|---|---|---|---|---|
| (B) at least one non-ionic ethylenically unsaturated monomer | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam | (B) is selected from the group consisting of methyl, ethyl, butyl or 2-ethyl-hexyl esters of acrylic, and methacrylic acid | (B) is selected from the group consisting of methyl, ethyl, butyl or 2-ethyl-hexyl esters of acrylic, and methacrylic acid |
| (C) at least one monomer of formula (1) | Formula (1), wherein $R_1$ denotes hydrogen or methyl, n is a real number in the range of $\geq 10$ to $\leq 80$, $R_2$ denotes branched, unsubstituted $C_{12}$-$C_{15}$ alkyl, and $C_{12}$-$C_{15}$ alkyl has an iso-index in the range of $\geq 1.5$ to $\leq 3.5$ | Formula (I), wherein $R_1$ denotes hydrogen or methyl, n is a real number in the range of $\geq 10$ to $\leq 70$, $R_2$ denotes branched, unsubstituted $C_{12}$-$C_{15}$ alkyl, and $C_{12}$-$C_{15}$ alkyl has an iso-index in the range of $\geq 1.5$ to $\leq 3.5$ | Formula (I), wherein $R_1$ is methyl, n is a real number in the range of $\geq 10$ to $\leq 60$, $R_2$ denotes branched, unsubstituted $C_{12}$-$C_{15}$ alkyl, and $C_{12}$-$C_{15}$ alkyl has an iso-index in the range of $\geq 1.8$ to $\leq 2.8$ | Formula (I), wherein $R_1$ is methyl, n is a real number in the range of $\geq 10$ to $\leq 50$, $R_2$ denotes branched, unsubstituted $C_{12}$-$C_{15}$ alkyl, and $C_{12}$-$C_{15}$ alkyl has an iso-index in the range of $\geq 2$ to $\leq 2.5$ |
| Optionally, (D) at least one cross linking reagent | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid |
| Optionally, (E) at least one ethylenically unsaturated monomer which is different from (A), (B), and (C) | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids |
| (F) optionally, at least one chain transfer agent | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, and 2-(ethylhexyl)thioglycolate | (F) is selected from the group consisting of n-dodecyl mercaptan, n-decyl mercaptan, octyl mercaptan, 1,8- dimercapto-3, 6-dioxaoctane, and 2-(ethylhexyl)thioglycolate |

TABLE 4

| Component(s) | m | n | o | p |
| --- | --- | --- | --- | --- |
| (A) at least one ethylenically unsaturated monomer with a carboxylic function | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride | (A) is selected from the group consisting of acrylic acid, methacrylic acid, $C_1$ to $C_4$ monoesters of maleic or itaconic acids, and mixtures thereof | (A) is selected from the group consisting of acrylic acid, methacrylic acid, $C_1$ to $C_4$ monoesters of maleic or itaconic acids, and mixtures thereof |
| (B) at least two different nonionic ethylenically unsaturated monomer | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam | (B) is selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam | (B) is selected from the group consisting of methyl, ethyl, butyl or 2-ethyl-hexyl esters of acrylic, methacrylic acid | (B) is selected from the group consisting of methyl, ethyl, butyl or 2-ethyl-hexyl esters of acrylic, methacrylic acid |
| (C) at least two different monomers of formula (1) | Formula (1), wherein $R_1$ denotes hydrogen or methyl, n is a real number in the range of $\geq 10$ to $\leq 80$, $R_2$ denotes branched, unsubstituted $C_{12}$-$C_{15}$ alkyl, and $C_{12}$-$C_{15}$ alkyl has an iso-index in the range of $\geq 1.5$ to $\leq 3.5$ | Formula (I), wherein $R_1$ denotes hydrogen or methyl, n is a real number in the range of $\geq 10$ to $\leq 70$, $R_2$ denotes branched, unsubstituted $C_{12}$-$C_{15}$ alkyl, and $C_{12}$-$C_{15}$ alkyl has an iso-index in the range of $\geq 1.5$ to $\leq 3.5$ | Formula (I), wherein $R_1$ is methyl, n is a real number in the range of $\geq 10$ to $\leq 60$, $R_2$ denotes branched, unsubstituted $C_{12}$-$C_{15}$ alkyl, and $C_{12}$-$C_{15}$ alkyl has an iso-index in the range of $\geq 1.8$ to $\leq 2.8$ | Formula (I), wherein $R_1$ is methyl, n is a real number in the range of $\geq 10$ to $\leq 50$, $R_2$ denotes branched, unsubstituted $C_{12}$-$C_{15}$ alkyl, and $C_{12}$-$C_{15}$ alkyl has an iso-index in the range of $\geq 2$ to $\leq 2.5$ |
| Optionally, (D) at least one cross linking reagent | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid | (D) is selected from the group consisting of ethylene glycol diacrylate, ethylene glycol dimethacrylate, trimethylolpropane-triacrylate, trimethylolpropanetri-methacrylate, allyl acrylate, methylenebisacrylamide, methylenebismethacrylamide, tetrallyloxyethane, triallylcyanurates, and allylic ethers of pentaerythritol, sorbitol, or sucrose or diallylester of phthalic acid |
| Optionally, (E) at least one ethylenically unsaturated monomer which is different from (A), (B), and (C) | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids | (E) is selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids |

TABLE 4-continued

| Component(s) | m | n | o | p |
|---|---|---|---|---|
| (F) optionally, at least one chain transfer agent | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, thiolactic acid and tert-dodecanthiol, 2-(ethylhexyl)thioglycolate and terpinolene | (F) is selected from the group consisting of n-dodecyl mercaptan, n-decyl mercaptan, octyl mercaptan, 1,8- dimercapto-3, 6-dioxaoctane, and 2-(ethylhexyl)thioglycolate | (F) is selected from the group consisting of n-dodecyl mercaptan, n-decyl mercaptan, octyl mercaptan, 1,8- dimercapto-3, 6-dioxaoctane, and 2-(ethylhexyl)thioglycolate |

Preferred variants 1 to 7 of the embodiments a to p are summarized in the Table 5.

TABLE 5

| Component(s) | 1 | 2 | 3 | 4 | 5 | 6 | 7 |
|---|---|---|---|---|---|---|---|
| (A) | ≥30 wt.-% to ≤70 wt.-% | ≥33 wt.-% to ≤67 wt.-% | ≥36 wt.-% to ≤64 wt.-% | ≥36 wt.-% to ≤55 wt.-% | ≥38 wt.-% to ≤55 wt.-% | ≥38 wt.-% to ≤50 wt.-% | ≥38 wt.-% to ≤45 wt.-% |
| (B) | ≥30 wt.-% to ≤70 wt.-% | ≥33 wt.-% to ≤67 wt.-% | ≥36 wt.-% to ≤64 wt.-% | ≥40 wt.-% to ≤60 wt.-% | ≥42 wt.-% to ≤58 wt.-% | ≥45 wt.-% to ≤55 wt.-% | ≥45 wt.-% to ≤55 wt.-% |
| (C) | ≥1 wt.-% to ≤40 wt.-% | ≥4 wt.-% to ≤30 wt.-% | ≥8 wt.-% to ≤30 wt.-% | ≥8 wt.-% to ≤30 wt.-% | ≥8 wt.-% to ≤25 wt.-% | ≥8 wt.-% to ≤20 wt.-% | ≥8 wt.-% to ≤20 wt.-% |
| (D) | ≥0 wt.-% to ≤1 wt.-% | ≥0 wt.-% to ≤0.8 wt.-% | ≥0 wt.-% to ≤0.6 wt.-% | ≥0 wt.-% to ≤0.6 wt.-% | ≥0 wt.-% to ≤0.5 wt.-% | ≥0 wt.-% to ≤0.5 wt.-% | ≥0 wt.-% to ≤0.4 wt.-% |
| (E) | ≥0 wt.-% to ≤10 wt.-% | ≥0 wt.-% to ≤9 wt.-% | ≥0 wt.-% to ≤8 wt.-% | ≥0 wt.-% to ≤7 wt.-% | ≥0 wt.-% to ≤6 wt.-% | ≥0 wt.-% to ≤5 wt.-% | ≥0 wt.-% to ≤5 wt.-% |
| (F) | ≥0 wt.-% to ≤1 wt.-% | ≥0 wt.-% to ≤0.9 wt.-% | ≥0 wt.-% to ≤0.8 wt.-% | ≥0 wt.-% to ≤0.7 wt.-% | ≥0 wt.-% to ≤0.6 wt.-% | ≥0 wt.-% to ≤0.5 wt.-% | ≥0 wt.-% to ≤0.5 wt.-% |

Preferred copolymer results from the following combinations of the embodiments a to p with variants 1 to 7: $a^1$, $a^2$, $a^3$, $a^4$, $a^5$, $a^6$, $a^7$, $b^1$, $b^2$, $b^3$, $b^4$, $b^5$, $b^6$, $b^7$, $c^1$, $c^2$, $c^3$, $c^4$, $c^5$, $c^6$, $c^7$, $d^1$, $d^2$, $d^3$, $d^4$, $d^5$, $d^6$, $d^7$, $e^1$, $e^2$, $e^3$, $e^4$, $e^5$, $e^6$, $e^7$, $f^1$, $f^2$, $f^3$, $f^4$, $f^5$, $f^6$, $f^7$, $g^1$, $g^2$, $g^3$, $g^4$, $g^5$, $g^6$, $g^7$, $h^1$, $h^2$, $h^3$, $h^4$, $h^5$, $h^6$, $h^7$, $i^1$, $i^2$, $i^3$, $i^4$, $i^5$, $i^6$, $i^7$, $j^1$, $j^2$, $j^3$, $j^4$, $j^5$, $j^6$, $j^7$, $k^1$, $k^2$, $k^3$, $k^4$, $k^5$, $k^6$, $k^7$, $l^1$, $l^2$, $l^3$, $l^4$, $l^5$, $l^6$, $l^7$, $m^1$, $m^2$, $m^3$, $m^4$, $m^5$, $m^6$, $m^7$, $n^1$, $n^2$, $n^3$, $n^4$, $n^5$, $n^6$, $n^7$, $o^1$, $o^2$, $o^3$, $o^4$, $o^5$, $o^6$, $o^7$, $p^1$, $p^2$, $p^3$, $p^4$, $p^5$, $p^6$, $p^7$. For example "$a^1$" means a combination of embodiment "a" with variant "1", i.e a copolymer containing ≥30 wt.-% to 70 wt.-% of at least one ethylenically unsaturated monomer with a carboxylic function (A) selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride, 30 wt.-% to ≤70 wt.-% of at least one non-ionic ethylenically unsaturated monomer (B) selected from the group consisting of methyl, ethyl, butyl or 2-ethyl-hexyl esters of acrylic and methacrylic acid, acrylonitrile, vinyl acetate, styrene, methylstyrene, diisobutylene, vinylpyrrolidone, vinylcaprolactam, 1 wt.-% to ≤40 wt.-% of at least one monomer (C) of formula (I) wherein $R_1$ denotes hydrogen or methyl, n is a real number in the range of ≥10 to ≤80, $R_2$ denotes branched, unsubstituted $C_{10}$-$C_{15}$alkyl, and $C_{10}$-$C_{15}$ alkyl has an iso-index in the range of ≥1.5 to ≤3.5, optionally, ≥0 wt.-% to ≤1 wt.-% of at least one cross linking reagent (D) selected from the group consisting of ethylene glycol diacrylate, ethylene glycol dimethacrylate, trimethylolpropanetriacrylate, trimethylolpropanetrimethacrylate, allyl acrylate, methylenebisacrylamide, methylenebismethacrylamide, tetralyloxyethane, triallylcyanurates, and allylic ethers of pentaerythritol, sorbitol, or sucrose or diallylester of phthalic acid, optionally, ≥0 wt.-% to ≤10 wt.-% of at least one ethylenically unsaturated monomer (E) which is different from (A), (B), and (C), selected from the group consisting of linear, branched, cycloaliphatic or arylaliphatic esters of acrylic or methacrylic acids, isomers of butyl (meth)acrylate, isomers of hexyl (meth)acrylate, n-octyl (meth)acrylate, 2-ethylhexyl (meth)acrylate, 1-decyl (meth)acrylate, 2-decyl (meth)acrylate, isodecyl (meth)acrylate, isomers of dodecyl (meth)acrylate, cyclohexyl (meth)acrylate, isobornyl (meth)acrylate, benzyl (meth)acrylate, vinylaromatic monomers, amide or nitrile derivatives of (meth)acrylic acids, and optionally, ≥0 wt.-% to ≤1 wt.-% of at least one chain transfer agent (F) selected from the group consisting of n-dodecyl mercaptan, n-decyl mercaptan, octyl mercaptan, 1,8-dimercapto-3,6-dioxaoctane, thiolactic acid and tert-dodecanthiol, 2-(ethylhexyl)thioglycolate and terpinolene.

The copolymer according to the present invention has the following advantages:

1. Effective thickener at high shear rates and creates a Newtonian rheology profile in aqueous coating formulations.
2. Environment friendly as it does not contain tin, APEO (alkylphenolethoxylate) and low amounts of volatile organic compounds.
3. Stability of rheology upon storage and compatibility with colorants.

Having generally described the invention, a further understanding can be obtained by reference to certain specific examples which are provided herein for the purpose of illustration only, and are not intended to be limiting unless otherwise specified.

EXAMPLES

Compounds

Chain transfer agent 1 (N-dodecylmercaptane),
Chain transfer agent 2-(ethylhexyl)thioglycolate),
Initiator 1 (Ammoniumpersulphate),
Initiator 2 (Sodiumpersulphate),
Ammonia and ammonium hydroxide are used as neutralising agent, and are available from Sigma Aldrich.
Ethyl acrylate, acrylic acid esters,
Methacrylic acid, unsaturated monocarboxylic acid,
Methyl methacrylate, methyl ester of acrylic acid,
Surfactant A (Disponil® FES 993), fatty alcohol, polyglycol ether sulphate, Na salt,
Surfactant B (Disponil® FES 77), 32% active anionic surfactant Sodium lauryl ether sulfate,
Surfactant C (Disponil® FES 27), 28% active anionic surfactant Sodium lauryl ether sulfate,
Surfactant D (Disponil SDS) 15% active anionic surfactant, Sodiumdodecylsulfate
Hydropalat® WE3240, an organic modified polysiloxane (silicone surfactant) dissolved in dipropylene glycol mono methyl ether, used as a wetting agent,
Dispex® CX 4320, a polycarboxylate copolymer sodium salt, used as pigment dispersing agent,
Solvenon® DPM, a mixture of isomers dipropylene glycol monomethyl ether, methoxypropoxy-propanol, methyldipropylene glycol which is used as a film forming agent,
Acronal® DS 6277, an acrylic latex polymer, used as a binder,
FoamStar® SI2210, a mixture of specially modified alcohols and a polysiloxane adduct, used as a defoamer,
FoamStar® ST 2438, defoamer based on organo-modified polysiloxanes and hyper-branched star polymer, and
Acronal® Plus 4130, an acrylic latex, used as a binder, are available from BASF SE, Ludwigshafen, Germany.
Kronos® 2190 is titanium oxide, available from Kronos.
Finntalc® M15 is a talc (Mg-Silicate), available from Mondo Minerals B.V.
TiPure® R 706 is a titanium oxide pigment, available from The Chemours Company TT, LLC.
Texanol® is an ester alcohol used as a film forming agent, available from Eastman Chemical Company.

Methods

The mean degree of branching determined was by $^1$H NMR spectroscopy by the method as follows:
A sample of the alcohol $R^2$—OH, used for the preparation of the monomer (C), was first derivatized with trichloroacetyl isocyanate (TAI) (J. Loccufier et al., Polymer Bulletin 27, 1991, 201). The signals of the esterified primary alcohols are situated at δ=4.7 to 4.0 ppm, those of the esterified secondary alcohols (if present) at about 5 ppm, and water present in the sample reacts with TAI to give carbamic acid. All methyl, methylene and methine protons are situated in the range from 2.4 to 0.4 ppm. The signals <1 ppm here are assigned to the methyl groups. From the spectrum obtained in this way, the mean degree of branching (iso index) may be calculated as follows:

Iso index (Ix)=((F(CH$_3$)/3)/(F(CH$_2$—OH)/2))−1 where F(CH$_3$) represents the signal area corresponding to the methyl protons, and F(CH$_2$—OH) represents the signal area of the methylene protons in the CH$_2$—OH group.

Newtonian index was determined to demonstrate if the rheological profile is rather Newtonian or more pseudoplastic. To calculate the Newtonian index the low shear viscosity at 1 s$^{-1}$ was divided by the high shear viscosity at a shear rate of 10000 s$^{-1}$. The lower the value of the Newtonian index more Newtonian the rheological profile is expected. The rheological profile was determined with an "Anton Paar MCR 302" rheometer with a cone-plate geometry of 25 mm diameter (cone angle 1°) between a shear rate of 0.1 and 10000 s$^{-1}$.

Emulsion Polymerization

Comminution may be achieved by using high shear force dispersion devices, for example a ultrasonic sound equipment (J. Dispersion Sci. Technology 2002, 23(1-3), 333-349) or a high pressure homogenizer (APV Gaulin homogenizer; Microfluidizer) The emulsification and comminution can be carried out continuously or batchwise. Apparatus for this purpose are known in the art. This is for example described in U.S. Pat. No. 5,108,654.

Synthesis of Monomer (C) of Formula (I)

The monomer (C) of formula (I) according to the present invention and monomer not within the scope of the invention were synthesized according to standard literature procedures from corresponding ethoxylates of technical alcohols. For example, DE10218752 describes the method of preparation of alkoxylate mixtures by reacting alkanols with alkylene oxides in the presence of a catalyst under alkoxylation conditions, which is followed by methacrylate synthesis. For example, M-01 corresponds to a monomer (C) which is out of the scope of the invention and is based on the commercial alcohol Lial® 123. This monomer was obtained by ethoxylation of Lial® 123 and then made polymerisable by functionalisation using a methacrylate group. Methacrylate synthesis was carried out using general procedures known in the art. For example, 1000 g alcohol ethoxylate (EO40) was charged into the reactor and stirred at 130° C. under vacuum for 3 h and then cool down to 80° C. Lean air is applied, and then 110 g methacrylic anhydride and 0.3 g butylhydroxytoluol was added. The mixture was keep at 80° C. for 15 hr and cooled down. All other monomers were derived from technical grade alcohols as starting material, which always comprise isomer mixtures. Table 6 provides the monomer (C) of formula (I) and monomer not within the scope of the invention which were used in the synthesis of HASE copolymer according to the present invention and HASE polymers which are not within the scope of the invention, respectively.

TABLE 6

| Monomer | R$_1$ | n | C- number | Iso index (Ix) |
|---|---|---|---|---|
| *M-01 | methacrylate | 40 | C$_{12}$/C$_{13}$ | 0.6 |
| *M-02 | methacrylate | 40 | C$_{12}$ | 1 |
| *M-03 | methacrylate | 40 | C$_{12}$/C$_{13}$ | 1 |
| M-04 | methacrylate | 40 | C$_{12}$/C$_{13}$ | 1.5 |
| M-04' | methacrylate | 40 | C$_{13}$ | 2 |
| M-05 | methacrylate | 40 | C$_{13}$ | 2.4 |
| M-06 | methacrylate | 40 | C$_{12}$/C$_{13}$ | 2.4 |
| M-07 | methacrylate | 40 | C$_{13}$ | 3 |
| *M-08 | methacrylate | 20 | C$_{12}$/C$_{13}$ | 0.6 |
| *M-09 | methacrylate | 20 | C$_{12}$/C$_{13}$ | 1 |
| *M-10 | methacrylate | 20 | C$_{12}$ | 1 |
| M-11 | methacrylate | 20 | C$_{12}$/C$_{13}$ | 1.5 |

TABLE 6-continued

| Monomer | $R_1$ | n | C- number | Iso index ($I_x$) |
|---|---|---|---|---|
| M-11' | methacrylate | 20 | $C_{12}/C_{13}$ | 2 |
| M-12 | methacrylate | 20 | $C_{13}$ | 2.4 |
| M-13 | methacrylate | 20 | $C_{13}$ | 2.4 |
| M-14 | methacrylate | 20 | $C_{12}/C_{13}$ | 3 |
| M-15 | methacrylate | 30 | $C_{10}/C_{13}$ | 1.7 |
| M-16 | methacrylate | 40 | $C_{10}/C_{13}$ | 1.7 |

*= not within the scope of the invention

Synthesis of HASE Copolymers

The HASE copolymer samples were obtained by standard emulsion polymerisation methods. Two non-limiting examples of such methods are provided as procedures 1, 2 and 3.

Procedure 1

50.9 wt.-% of water, 70.6 wt.-% of solid surfactant A, monomers and chain transfer agent were weighed into the monomer emulsion feed vessel. 42.7 wt.-% of water and 29.4 wt.-% of surfactant was weighed into the polymerization vessel and heated to 85° C. Initiator was dissolved in 6.4 wt.-% water and placed into the initiator feed vessel. 5 wt.-% of the monomer emulsion was added into the polymerization vessel, afterwards 30 wt.-% of the initiator solution was added. The monomer emulsion was fed into the polymerization vessel within 120 minutes and in parallel, the remaining initiator solution was added in 150 minutes. After the end of both feeds the product was stirred for an additional hour at 85° C., cooled down and filtered to obtain the copolymer sample. The wt.-% is related to the total weight of the individual components ie. water, monomers, solid surfactant A, chain transfer agent, initiator.

Procedure 2

18.3 wt.-% of water, solid surfactant B, monomers and chain transfer agent were weight into the monomer emulsion feed vessel. 80.6 wt.-% of water and solid surfactant C was weight into the polymerization vessel and heated to 85° C. Initiator was dissolved in 1.1 wt.-% water and placed into the initiator feed vessel. 5 wt.-% of the monomer emulsion was added into the polymerization vessel, afterwards the initiator solution was added. The monomer emulsion was fed parallel into the polymerization vessel within 120 minutes. After the end of both feeds the product was stirred for an additional hour at 85° C., cooled down and filtered to obtain the copolymer sample. The wt.-% is related to the total weight of the individual components ie. water, monomers, solid surfactant B, solid surfactant C, chain transfer agent, initiator.

Procedure 3

50.5 wt.-% of water, 70 wt.-% of solid surfactant D and B, monomers and chain transfer agent were weight into the monomer emulsion feed vessel. 48.3 wt.-% of water and 30 wt.-% of surfactant D and B was weight into the polymerization vessel and heated to 85° C. Initiator was dissolved in 1.2 wt.-% water and placed into the initiator feed vessel. 5 wt.-% of the monomer emulsion was added into the polymerization vessel, afterwards 30 wt.-% of the initiator solution was added. The monomer emulsion was fed into the polymerization vessel within 120 minutes and in parallel, the remaining initiator solution was added in 150 minutes. After the end of both feeds the product was stirred for an additional hour at 85° C., cooled down and filtered to obtain the copolymer sample. The wt.-% is related to the total weight of the individual components ie. water, monomers, solid surfactant B, solid surfactant D, chain transfer agent, initiator.

Table 7 provides the HASE copolymer examples 1 to 14 prepared by following the method of procedure 1.

TABLE 7

| | Compounds | | | | | | | |
|---|---|---|---|---|---|---|---|---|
| Example | Water (in g) | Surfactant A (in g) | Ethyl acrylate (in g) | Meth acrylic acid (in g) | Methyl meth acrylate (in g) | Monomer (C) (in g) | Chain transfer agent 1 (in g) | Initiator 1 (in g) |
| 01* | 759 | 20 | 250 | 204 | 31 | M-01: 25 | 1.3 | 1.3 |
| 02* | 759 | 20 | 250 | 204 | 31 | M-02: 25 | 1.3 | 1.3 |
| 03* | 759 | 20 | 250 | 204 | 31 | M-03: 25 | 1.3 | 1.3 |
| 04 | 759 | 20 | 250 | 204 | 31 | M-04: 25 | 1.3 | 1.3 |
| 04' | 759 | 20 | 250 | 204 | 31 | M-04': 25 | 1.3 | 1.3 |
| 05 | 759 | 20 | 250 | 204 | 31 | M-05: 25 | 1.3 | 1.3 |
| 06 | 759 | 20 | 250 | 204 | 31 | M-06: 25 | 1.3 | 1.3 |
| 07 | 759 | 20 | 250 | 204 | 31 | M-07: 25 | 1.3 | 1.3 |
| 08* | 759 | 20 | 225 | 204 | 31 | M-01: 50 | 1.3 | 1.3 |
| 09* | 759 | 20 | 225 | 204 | 31 | M-02: 50 | 1.3 | 1.3 |
| 10* | 759 | 20 | 225 | 204 | 31 | M-03: 50 | 1.3 | 1.3 |
| 11 | 759 | 20 | 225 | 204 | 31 | M-04: 50 | 1.3 | 1.3 |
| 11' | 759 | 20 | 225 | 204 | 31 | M-04': 50 | 1.3 | 1.3 |
| 12 | 759 | 20 | 225 | 204 | 31 | M-05: 50 | 1.3 | 1.3 |
| 13 | 759 | 20 | 225 | 204 | 31 | M-06: 50 | 1.3 | 1.3 |
| 14 | 759 | 20 | 225 | 204 | 31 | M-07: 50 | 1.3 | 1.3 |

*= not within the scope of the invention

Table 8 provides the HASE copolymer examples 15 to 21 prepared by following the method of procedure 2 and varying the amount of varying the amounts of ethylacrylate and monomer (C).

TABLE 8

| Example | Water (in g) | Surfactant(s) B and C (in g) | Ethyl acrylate (in g) | Meth acrylic acid (in g) | Methyl meth acrylate (in g) | Monomer (C) (in g) | Chain transfer agent 2 (in g) | Initiator 2 (in g) |
|---|---|---|---|---|---|---|---|---|
| 15* | 1289 | B: 8.6 C: 8.6 | 223 | 178 | 0 | M-01: 45 | 1.1 | 1.1 |
| 16* | 1289 | B: 8.6 C: 8.6 | 223 | 178 | 0 | M-02: 45 | 1.1 | 1.1 |
| 17* | 1289 | B: 8.6 C: 8.6 | 223 | 178 | 0 | M-03: 45 | 1.1 | 1.1 |
| 18 | 1289 | B: 8.6 C: 8.6 | 223 | 178 | 0 | M-04: 45 | 1.1 | 1.1 |
| 18' | 1289 | B: 8.6 C: 8.6 | 223 | 178 | 0 | M-04': 45 | 1.1 | 1.1 |
| 19 | 1289 | B: 8.6 C: 8.6 | 223 | 178 | 0 | M-05: 45 | 1.1 | 1.1 |
| 20 | 1289 | B: 8.6 C: 8.6 | 223 | 178 | 0 | M-06: 45 | 1.1 | 1.1 |
| 21 | 1289 | B: 8.6 C: 8.6 | 223 | 178 | 0 | M-07: 45 | 1.1 | 1.1 |

*= not within the scope of the invention

Table 9a provides the HASE copolymer examples 22 to 28 prepared by following the method of procedure 1, by varying the amounts of ethylacrylate and monomer (C).

TABLE 9 (a)

| example | Water (in g) | Surfactant (A) (in g) | Ethyl acrylate (in g) | Meth acrylic acid (in g) | Methyl meth acrylate (in g) | Monomer (C) (in g) | Chain transfer agent 1 (in g) | Initiator 1 (in g) |
|---|---|---|---|---|---|---|---|---|
| 22* | 759 | 20 | 200 | 204 | 31 | MM-01: 75 | 1.3 | 1.3 |
| 23* | 759 | 20 | 200 | 204 | 31 | MM-02: 75 | 1.3 | 1.3 |
| 24* | 759 | 20 | 200 | 204 | 31 | MM-03: 75 | 1.3 | 1.3 |
| 25 | 759 | 20 | 200 | 204 | 31 | MM-04: 75 | 1.3 | 1.3 |
| 25' | 759 | 20 | 200 | 204 | 31 | MM-04': 75 | 1.3 | 1.3 |
| 26 | 759 | 20 | 200 | 204 | 31 | MM-05: 75 | 1.3 | 1.3 |
| 27 | 759 | 20 | 200 | 204 | 31 | MM-06: 75 | 1.3 | 1.3 |
| 28 | 759 | 20 | 200 | 204 | 31 | MM-07: 75 | 1.3 | 1.3 |

*= not within the scope of the invention

Table 9b provides the HASE copolymer examples 29 to 34 prepared by following the method of procedure 3, by varying the amounts of ethylacrylate and monomer (C).

TABLE 9 (b)

| example | Water (in g) | Surfactant(s) B and D (in g) | Ethyl acrylate (in g) | Meth acrylic acid (in g) | Methyl meth acrylate (in g) | Monomer (C) (in g) | Chain transfer agent 1 (in g) | Initiator 2 (in g) |
|---|---|---|---|---|---|---|---|---|
| 29 | 766.4 | B: 3.2 D: 1.6 | 159.3 | 127.4 | 0 | M-16: 31.8 | 0.8 | 0.8 |
| 30 | 766.4 | B: 3.2 D: 1.6 | 143.3 | 127.4 | 0 | M-11: 47.8 | 0.8 | 0.8 |
| 31 | 766.4 | B: 3.2 D: 1.6 | 143.3 | 127.4 | 0 | M-16: 47.8 | 0.8 | 0.8 |
| 32 | 766.4 | B: 3.2 D: 1.6 | 143.3 | 127.4 | 0 | M-15: 47.8 | 0.8 | 0.8 |

TABLE 9 (b)-continued

| | | | | Compounds | | | | |
|---|---|---|---|---|---|---|---|---|
| example | Water (in g) | Surfactant(s) B and D (in g) | Ethyl acrylate (in g) | Meth acrylic acid (in g) | Methyl meth acrylate (in g) | Monomer (C) (in g) | Chain transfer agent 1 (in g) | Initiator 2 (in g) |
| 33 | 766.4 | B: 3.2 D: 1.6 | 143.3 | 127.4 | 0 | M-13: 47.8 | 0.8 | 0.8 |
| 34 | 766.4 | B: 3.2 D: 1.6 | 143.3 | 127.4 | 0 | M-14: 47.8 | 0.8 | 0.8 |

A coating formulation was prepared to demonstrate that the copolymer of the present invention is more efficient as a thickener in the high shear range ($1000\ s^{-1}$ to $10000\ s^{-1}$) and exhibit a more Newtonian rheological profile than the state of art which is represented by the examples which are not within the scope of the invention.

A wood coating formulation was prepared by adding 1 g of the copolymer example mentioned in Table 7, 8, 9 (a) and 9 (b), at an adjusted solids content of 25%, into 99 g of the coating formulation mentioned in table 10 below, under stirring. The resulting samples were stored over night at room temperature and then the rheological profile was determined. Newtonian index was determined to demonstrate that the rheological profile of coating formulation with the copolymer according to the present invention is more Newtonian than pseudoplastic.

TABLE 10

| Compound | Purpose | Quantity [g] |
|---|---|---|
| Water | solvent | 306.1 |
| Ammonia conc. | neutralising agent | 1.5 |
| Hydropalat ® WE3240 | wetting agent | 1.5 |
| FoamStar ® Si2210 | defoamer | 4.6 |
| Dispex ® CX 4320 | dispersant | 9.2 |
| Solvenon ® DPM | film forming agent | 30.6 |
| Kronos ® 2190 | titanium dioxide | 336.7 |
| Finntalc ® M15 | filler | 76.5 |
| Acronal ® DS 6277 | binder | 727.0 |
| FoamStar ® SI2210 | defoamer | 6.1 |

The viscosity at high shear range ($1000\ s^{-1}$ to $10000\ s^{-1}$) and Newtonian index were determined for the wood coating formulation. The viscosity values are provided in mPas.

For comparison, examples which are not within the scope of the invention ie. 01*, 08*, 15*, 17*, 22* and 24* differing in the amounts of components (eg. ethyl acrylate and monomer (C)), were 20 compared with copolymer according to the present invention wherein same amount of different components has been used. The results obtained have been provided in Table 11 (a) to 11 (d).

For example, example 01* has been compared with example 04' and 07, and results are provided as below:

TABLE 11 (a)

| Example | Iso-index (Ix) | $1\ s^{-1}$ (mPas) | $10\ s^{-1}$ (mPas) | $100\ s^{-1}$ (mPas) | $1000\ s^{-1}$ (mPas) | $10000\ s^{-1}$ (mPas) | Newtonian index ($1\ s^{-1}/10000\ s^{-1}$) |
|---|---|---|---|---|---|---|---|
| 01* | 0.6 | 24500 | 10400 | 3710 | 1020 | 194 | 126 |
| 04' | 2 | 22400 | 10100 | 3830 | 1100 | 219 | 102 |
| 07 | 3 | 19000 | 8740 | 3400 | 1020 | 215 | 88 |

*= not within the scope of the invention

Example 08* has been compared with example 11', 12 and 14 and, results are provided as below:

TABLE 11 (b)

| Example | Iso-index (Ix) | $1\ s^{-1}$ (mPas) | $10\ s^{-1}$ (mPas) | $100\ s^{-1}$ (mPas) | $1000\ s^{-1}$ (mPas) | $10000\ s^{-1}$ (mPas) | Newtonian index ($1\ s^{-1}/10000\ s^{-1}$) |
|---|---|---|---|---|---|---|---|
| 08* | 0.6 | 28700 | 10300 | 3170 | 843 | 164 | 175 |
| 11' | 2 | 16500 | 7040 | 2720 | 904 | 193 | 85 |
| 12 | 2.4 | 28500 | 11200 | 4040 | 1190 | 227 | 126 |
| 14 | 3 | 14700 | 6370 | 2410 | 789 | 180 | 82 |

*= not within the scope of the invention

For example, example 15* and 17* have been compared with example 19, 20 and 21 and results are provided as below:

TABLE 11 (c)

| Example | Iso-index (Ix) | 1 s$^{-1}$ (mPas) | 10 s$^{-1}$ (mPas) | 100 s$^{-1}$ (mPas) | 1000 s$^{-1}$ (mPas) | 10000 s$^{-1}$ (mPas) | Newtonian index (1 s$^{-1}$/10000 s$^{-1}$) |
|---|---|---|---|---|---|---|---|
| 15* | 0.6 | 18710 | 7241 | 2386 | 672 | 139 | 135 |
| 17* | 1 | 15560 | 6369 | 2219 | 660 | 137 | 114 |
| 19 | 2.4 | 11870 | 5588 | 2210 | 732 | 155 | 77 |
| 20 | 2.4 | 11470 | 5145 | 1963 | 643 | 144 | 79 |
| 21 | 3 | 9487 | 4386 | 1711 | 583 | 139 | 68 |

*= not within the scope of the invention

For example, example 22* and 24* have been compared with example 25, 25', 26, 27, 28, 30, 31, 32, 33 and 34 and results are provided as below:

TABLE 11 (d)

| Example | Iso-index (Ix) | 1 s$^{-1}$ (mPas) | 10 s$^{-1}$ (mPas) | 100 s$^{-1}$ (mPas) | 1000 s$^{-1}$ (mPas) | 10000 s$^{-1}$ (mPas) | Newtonian index (1 s$^{-1}$/10000 s$^{-1}$) |
|---|---|---|---|---|---|---|---|
| 22* | 0.6 | 56100 | 15900 | 3700 | 785 | 125 | 449 |
| 24* | 1 | 58000 | 16000 | 3810 | 821 | 132 | 439 |
| 25 | 1.5 | 53900 | 16100 | 3860 | 834 | 137 | 393 |
| 25' | 2 | 30700 | 12200 | 3600 | 883 | 152 | 202 |
| 26 | 2.4 | 46500 | 16900 | 4540 | 1030 | 158 | 294 |
| 27 | 2.4 | 45700 | 15100 | 3800 | 844 | 142 | 322 |
| 28 | 3 | 29800 | 10400 | 2930 | 712 | 134 | 222 |
| 30 | 1.5 | 37400 | 12500 | 3290 | 751 | 138 | 271 |
| 31 | 1.7 | 16100 | 6790 | 2390 | 676 | 128 | 126 |
| 32 | 1.7 | 26600 | 9760 | 2960 | 732 | 133 | 200 |
| 33 | 2.4 | 30000 | 10700 | 2990 | 707 | 137 | 219 |
| 34 | 3 | 26800 | 9950 | 2900 | 706 | 139 | 193 |

An architectural interior paint formulation was prepared by diluting 1 g of the copolymer example mentioned in Table 7, 8, 9 (a) and 9 (b) at an adjusted solids content of 25%, with 1 g water and adding it into 97 g of the coating formulation mentioned in Table 12 below, under stirring. The remaining polymer in the dilution glass vial was rinsed with additional 1 g of water and also added to the formulation. The resulting samples were stored over night at room temperature and then the rheological profile was determined. Newtonian index was determined to demonstrate that the rheological profile of coating formulation with the copolymer according to the present invention is more Newtonian than pseudoplastic.

TABLE 12

| Compound | Purpose | Quantity [g] |
|---|---|---|
| Water | solvent | 602.7 |
| Ammonium hydroxide | neutralising agent | 2.0 |
| Dispex ® CX 4320 | dispersant | 26.1 |
| Foamstar ® ST 2438 | defoamer | 4.0 |

TABLE 12-continued

| Compound | Purpose | Quantity [g] |
|---|---|---|
| TiPure ® R 706 | titanium dioxide | 452.4 |
| Foamstar ® ST 2438 | defoamer | 4.0 |
| Texanol ® | film forming agent | 4.0 |
| Acronal ® Plus 4130 | binder | 904.7 |

The viscosity at high shear range (1000 s$^{-1}$ to 10000 s$^{-1}$) and Newtonian index were determined for the architectural interior paint formulation. The viscosity values are provided in mPas.

For comparison, examples which are not within the scope of the invention ie. 08*, 10*, 15*, 17*, 22*, differing in the amounts of components (e.g. ethyl acrylate and monomer (C)), were compared with copolymer according to the present invention wherein same amount of different components has been used. The results obtained have been provided in Table 13 (a) to 13 (c).

For example, example 08* and 10* have been compared with example 11', 12, 13 and 14, and results are provided as below:

TABLE 13 (a)

| Example | Ix (mPas) | 1 s$^{-1}$ (mPas) | 10 s$^{-1}$ (mPas) | 100 s$^{-1}$ (mPas) | 1000 s$^{-1}$ (mPas) | 10000 s$^{-1}$ (mPas) | Newtonian index (1 s$^{-1}$/ 10000 s$^{-1}$) |
|---|---|---|---|---|---|---|---|
| 08* | 0.6 | 1590 | 532 | 214 | 96 | 33 | 48 |
| 10* | 1 | 1589 | 520 | 212 | 99 | 34 | 46 |
| 11' | 2 | 1173 | 430 | 194 | 100 | 39 | 30 |

TABLE 13 (a)-continued

| Example | Ix (mPas) | 1 s⁻¹ (mPas) | 10 s⁻¹ (mPas) | 100 s⁻¹ (mPas) | 1000 s⁻¹ (mPas) | 10000 s⁻¹ (mPas) | Newtonian index (1 s⁻¹/ 10000 s⁻¹) |
|---|---|---|---|---|---|---|---|
| 12 | 2.4 | 1161 | 423 | 190 | 103 | 39 | 29 |
| 13 | 2.4 | 1273 | 442 | 188 | 94 | 35 | 36 |
| 14 | 3 | 1228 | 418 | 176 | 88 | 36 | 34 |

*= not within the scope of the invention

For example, example 15* and 17* have been compared with example 18', 19, 20 and 29, and results are provided as below:

TABLE 13 (b)

| Example | Ix (mPas) | 1 s⁻¹ (mPas) | 10 s⁻¹ (mPas) | 100 s⁻¹ (mPas) | 1000 s⁻¹ (mPas) | 10000 s⁻¹ (mPas) | Newtonian index (1 s⁻¹/10000 s⁻¹) |
|---|---|---|---|---|---|---|---|
| 15* | 0.6 | 1216 | 559 | 292 | 122 | 38 | 32 |
| 17* | 1 | 1251 | 564 | 294 | 124 | 40 | 32 |
| 18' | 2 | 662 | 347 | 197 | 104 | 41 | 16 |
| 19 | 2.4 | 819 | 443 | 273 | 138 | 45 | 18 |
| 20 | 2.4 | 1062 | 510 | 295 | 130 | 43 | 25 |
| 29 | 1.7 | 380 | 259 | 164 | 99 | 40 | 9 |

*= not within the scope of the invention

For example, example 22* has been compared with example 25, 25', 26, 27, 28, 30, 31 and 32, and results are provided as below:

TABLE 13 (c)

| Example | Ix (mPas) | 1 s⁻¹ (mPas) | 10 s⁻¹ (mPas) | 100 s⁻¹ (mPas) | 1000 s⁻¹ (mPas) | 10000 s⁻¹ (mPas) | Newtonian index (1 s⁻¹/10000 s⁻¹) |
|---|---|---|---|---|---|---|---|
| 22* | 0.6 | 1805 | 645 | 273 | 117 | 39 | 46 |
| 25 | 1.5 | 1804 | 697 | 318 | 133 | 44 | 41 |
| 25' | 2 | 1138 | 410 | 190 | 102 | 39 | 29 |
| 26 | 2.4 | 1242 | 465 | 228 | 121 | 43 | 29 |
| 27 | 2.4 | 1673 | 666 | 317 | 137 | 46 | 36 |
| 28 | 3 | 1275 | 480 | 228 | 106 | 39 | 33 |
| 30 | 1.5 | 523 | 347 | 195 | 97 | 39 | 13 |
| 31 | 1.7 | 643 | 442 | 294 | 153 | 50 | 13 |
| 32 | 1.7 | 546 | 355 | 218 | 114 | 41 | 13 |

*= not within the scope of the invention

The comparative examples clearly demonstrate that copolymer examples of the present invention having a monomer (C) of formula (I) with $R_2$ derived from $C_{10}$-$C_{15}$-alcohols with a mean degree of branching (iso-index) in the range from 1.5-3.5 exhibit better thickening efficiency at high shear rates (10000 s⁻¹) and a Newtonian rheology profile of the coating formulations.

The invention claimed is:

1. A copolymer which is obtained by reacting a mixture comprising:
(A) ≥30 wt.-% to ≤70 wt.-% of at least one ethylenically unsaturated monomer with a carboxylic function,
(B) ≥30 wt.-% to ≤70 wt.-% of at least one non-ionic ethylenically unsaturated monomer,
(C) ≥1 wt.-% to ≤40 wt.-% of at least one monomer of formula (I)

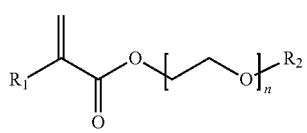

wherein
$R_1$ denotes hydrogen or methyl,
n is a real number in the range of ≥10 to ≤80, and
$R_2$ denotes branched, unsubstituted $C_{10}$-$C_{15}$ alkyl,
(D) ≥0 wt.-% to ≤1 wt.-% of at least one crosslinking reagent,
(E) ≥0 wt.-% to ≤10 wt.-% of at least one ethylenically unsaturated monomer which is different from (A), (B), and (C), and
(F) ≥0 wt.-% to ≤1 wt.-% of at least one chain transfer agent, wherein wt.-% is based on the total weight of the mixture, and wherein the $C_{10}$-$C_{15}$ alkyl has a mean degree of branching (iso-index) in the range of ≥1.5 to ≤3.5.

2. The copolymer according to claim 1, wherein the $C_{10}$-$C_{15}$ alkyl has a mean degree of branching (iso-index) in the range of ≥1.8 to ≤2.8.

3. The copolymer according to claim 1, wherein the $C_{10}$-$C_{15}$ alkyl has a mean degree of branching (iso-index) in the range of ≥2 to ≤2.5.

4. The copolymer according to claim 1, wherein $R_2$, denotes branched, unsubstituted $C_{12}$-$C_{15}$ alkyl.

5. The copolymer according to claim 4, wherein the $C_{12}$-$C_{15}$ alkyl has a mean degree of branching (iso-index) in the range of ≥1.8 to ≤2.8.

6. The copolymer according to claim 4, wherein the $C_{12}$-$C_{15}$ alkyl has a mean degree of branching (iso-index) in the range of ≥2 to ≤2.5.

7. The copolymer according to claim 1, wherein $R_1$ denotes methyl.

8. The copolymer according to claim 1, wherein the at least one ethylenically unsaturated monomer with a carboxylic function (A) is provided in an amount of 33 wt.-% to ≤67 wt.-%.

9. The copolymer according to claim 1, wherein the at least one ethylenically unsaturated monomer with a carboxylic function (A) is provided in an amount of 36 wt.-% to ≤64 wt.-%.

10. The copolymer according to claim 1, wherein the at least one non-ionic ethylenically unsaturated monomer (B) is provided in an amount of ≥33 wt.-% to ≤67 wt.-%.

11. The copolymer according to claim 1, wherein the at least one non-ionic ethylenically unsaturated monomer (B) is provided in an amount of ≥40 wt.-% to ≤60 wt.-%.

12. The copolymer according to claim 1, wherein the at least one non-ionic ethylenically unsaturated monomer (B) is a mixture of at least two different non-ionic ethylenically unsaturated monomers (B).

13. The copolymer according to claim 12, wherein the at least two different non-ionic ethylenically unsaturated monomers (B) are provided in an amount of ≥33 wt.-% to ≤67 wt.-%.

14. The copolymer according to claim 12, wherein the at least two different non-ionic ethylenically unsaturated monomers (B) are provided in an amount of ≥40 wt.-% to ≤60 wt.-%.

15. The copolymer according to claim 1, wherein the at least one monomer (C) is a mixture of at least two different monomers of formula (I).

16. The copolymer according to claim 1, wherein the at least one monomer (C) of formula (I) is provided in an amount of ≥8 wt.-% to ≤30 wt.-%.

17. The copolymer according to claim 1, wherein the at least one monomer (C) of formula (I) is provided in an amount of ≥8 wt.-% to ≤20 wt.-%.

18. The copolymer according to claim 1, wherein the at least one cross linking reagent (D) is provided in an amount of ≥0 wt.-% to ≤0.5 wt.-%.

19. The copolymer according to claim 1, wherein the at least one monomer (E) is provided in an amount of ≥0 wt.-% to ≤5 wt.-%.

20. The copolymer according to claim 1, wherein the at least one chain transfer agent (F) is provided in an amount of ≥0 wt.-% to ≤0.5 wt.-%.

21. The copolymer according to claim 1, wherein the at least one ethylenically unsaturated monomer with a carboxylic function (A) is selected from the group consisting of acrylic acid, methacrylic acid, $C_1$ to $C_4$ monoesters of maleic or itaconic acids, and mixtures thereof, or is selected from the group consisting of ethylenically unsaturated monomer with a carboxylic function, consisting of crotonic, isocrotonic, cinnamic, itaconic, maleic acid, and maleic anhydride.

22. The copolymer according to claim 1, wherein the at least one ethylenically unsaturated monomer with a carboxylic function (A) is selected from the group consisting of acrylic acid, methacrylic acid, $C_1$ to $C_4$ monoesters of maleic or itaconic acids, and mixtures thereof.

23. The copolymer according to claim 1, the at least one non-ionic ethylenically unsaturated monomer (B) is selected from the group consisting of methyl, ethyl, butyl or 2-ethylhexyl esters of acrylic and methacrylic acid.

24. The copolymer according to claim 1, wherein in the at least one monomer (C) of formula (I) $R_1$; is a methyl and n is a real number in the range of ≥10 to ≤60.

25. The copolymer according to claim 1, wherein in the at least one monomer (C) of formula (I) $R_1$ is a methyl and n is a real number in the range of ≥10 to ≤50.

26. The copolymer according to claim 1, wherein the at least one crosslinking reagent (D) is selected from the group consisting of
ethylene glycol diacrylate;
ethylene glycol dimethacrylate;
trimethylolpropanetriacrylate;
trimethylolpropanetrimethacrylate;
allyl acrylate;
methylenebisacrylamide;
methylenebismethacrylamide;
tetrallyloxyethane;
triallylcyanurates;
allylic ethers of pentaerythritol, sorbitol, or sucrose; and
a diallylester of phthalic acid.

27. The copolymer according to claim 1, wherein at least one ethylenically unsaturated monomer (E) is selected from the group consisting of
linear, branched, cycloaliphatic or arylaliphatic esters of acrylic or methacrylic acids;
isomers of butyl (meth)acrylate;
isomers of hexyl (meth)acrylate;
n-octyl (meth)acrylate;
2-ethylhexyl (meth)acrylate;
1-decyl (meth)acrylate;
2-decyl (meth)acrylate;
isodecyl (meth)acrylate;
isomers of dodecyl (meth)acrylate, cyclohexyl (meth)acrylate, isobornyl (meth)acrylate or benzyl (meth)acrylate;
vinylaromatic monomers and
amide or nitrile derivatives of (meth)acrylic acids.

28. The copolymer according to claim 1, wherein at least one chain transfer agent (F) is selected from the group consisting of
n-dodecyl mercaptan;
n-decyl mercaptan;
octyl mercaptan;
1,8-dimercapto-3,6-dioxaoctane;
thiolactic acid;
tert-dodecanthiol;
2-(ethylhexyl)thioglycolate; and
terpinolene.

29. The copolymer according to claim 1, which is obtained by reacting a mixture comprising:
(A) ≥30 wt.-% to ≤70 wt.-% of at least one ethylenically unsaturated monomer with a carboxylic function selected from the group consisting of
acrylic acid;
methacrylic acid;
$C_1$ to $C_4$ monoesters of maleic or itaconic acids, and mixtures thereof; and
ethylenically unsaturated monomer with a carboxylic function, consisting of crotonic, isocrotonic, cinnamic, itaconic, maleic acid, and maleic anhydride,
(B) ≥30 wt.-% to ≤70 wt.-% of at least one non-ionic ethylenically unsaturated monomer selected from the group consisting of
methyl, ethyl, butyl or 2-ethyl-hexyl esters of acrylic and methacrylic acid;
acrylonitrile;
vinyl acetate;
styrene;
methylstyrene;
diisobutylene;
vinylpyrrolidone and
vinylcaprolactam,
(C) ≥1 wt.-% to ≤40 wt.-% of at least one monomer of formula (I)

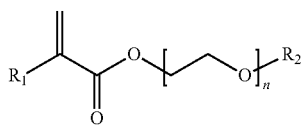

wherein
$R_1$ denotes hydrogen or methyl,
n is a real number in the range of ≥10 to ≤80, and
$R_1$ denotes branched, unsubstituted $C_{10}$-$C_{15}$ alkyl,
(D) ≥0 wt.-% to ≤1 wt.-% of at least one crosslinking reagent selected from the group consisting of
ethylene glycol diacrylate;
ethylene glycol dimethacrylate;
trimethylolpropanetriacrylate;
trimethylolpropanetrimethacrylate;
allyl acrylate;
methylenebisacrylamide;
methylenebismethacrylamide;
tetrallyloxyethane;
triallylcyanurates;
allylic ethers of pentaerythritol, sorbitol, or sucrose, and
a diallylester of phthalic acid,
(E) ≥0 wt.-% to ≤10 wt.-% of at least one ethylenically unsaturated monomer which is different from (A), (B), and (C), selected from the group consisting of
linear, branched, cycloaliphatic or arylaliphatic esters of acrylic or methacrylic acids; isomers of butyl (meth)acrylate;
isomers of hexyl (meth)acrylate, n-octyl (meth)acrylate, 2-ethylhexyl (meth)acrylate, 1-decyl (meth)acrylate, 2-decyl (meth)acrylate or isodecyl (meth)acrylate;
isomers of dodecyl (meth)acrylate, cyclohexyl (meth)acrylate, isobornyl (meth)acrylate or benzyl (meth)acrylate;
vinylaromatic monomers; and
amide or nitrile derivatives of (meth)acrylic acids,
(F) ≥0 wt.-% to ≤1 wt.-% of at least one chain transfer agent selected from the group consisting of
N-dodecyl mercaptan;
n-decyl mercaptan;
octyl mercaptan;
1,8-dimercapto-3,6-dioxaoctane;
thiolactic acid;
tert-dodecanthiol;
2 (ethylhexyl)thioglycolate and
terpinolene,
wherein wt.-% is based on the total weight of the mixture, and
wherein the $C_{10}$-$C_{15}$ alkyl has a mean degree of branching (iso-index) in the range of ≥1.5 to ≤3.5.

30. The copolymer according to claim 1, which is obtainable obtained by reacting a mixture comprising:
(A) ≥30 wt.-% to ≤70 wt.-% of at least one ethylenically unsaturated monomer with a carboxylic function selected from the group consisting of
acrylic acid;
methacrylic acid;
$C_1$ to $C_4$ monoesters of maleic or itaconic acids, and mixtures thereof; and
ethylenically unsaturated monomer with a carboxylic function, consisting of crotonic, isocrotonic, cinnamic, itaconic, maleic acid, and maleic anhydride,
(B) ≥30 wt.-% to ≤70 wt.-% of at least two different non-ionic ethylenically unsaturated monomers selected from the group consisting of
methyl, ethyl, butyl or 2-ethyl-hexyl esters of acrylic and methacrylic acid,
acrylonitrile;
vinyl acetate;
styrene;
methylstyrene;
diisobutylene;
vinylpyrrolidone and
vinylcaprolactam,
(C) ≥1 wt.-% to ≤40 wt.-% of at least two different monomers of formula (I)

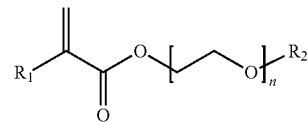

wherein
$R_1$ denotes hydrogen or methyl,
n is a real number in the range of ≥10 to 80, and
$R_2$ denotes branched, unsubstituted $C_{10}$-$C_{15}$ alkyl,
(D) ≥0 wt.-% to ≤1 wt.-% of at least one crosslinking reagent selected from the group consisting of
ethylene glycol diacrylate;
ethylene glycol dimethacrylate;
trimethylolpropanetriacrylate;
trimethylolpropanetrimethacrylate
allyl acrylate;
methylenebisacrylamide;
methylenebismethacrylamide;
tetrallyloxyethane;
triallylcyanurates;
allylic ethers of pentaerythritol, sorbitol, or sucrose, and
a diallylester of phthalic acid,
(E) ≥0 wt.-% to ≤10 wt.-% of at least one ethylenically unsaturated monomer which is different from (A), (B), and (C), selected from the group consisting of linear, branched, cycloaliphatic or arylaliphatic esters of acrylic or methacrylic acids;
isomers of butyl (meth)acrylate;
isomers of hexyl (meth)acrylate, n-octyl (meth)acrylate, 2-ethylhexyl (meth)acrylate, 1-decyl (meth)acrylate, 2-decyl (meth)acrylate or isodecyl (meth)acrylate,
isomers of dodecyl (meth)acrylate, cyclohexyl (meth)acrylate, isobornyl (meth)acrylate or benzyl (meth)acrylate;
vinylaromatic monomers and
amide or nitrile derivatives of (meth)acrylic acids,
(F) ≥0 wt.-% to ≤1 wt.-% of at least one chain transfer agent selected from the group consisting of
N-dodecyl mercaptan;
n-decyl mercaptan;
octyl mercaptan;
1,8-dimercapto-3,6-dioxaoctane;
thiolactic acid;
tert-dodecanthiol;
2-(ethylhexyl)thioglycolate and
terpinolene,
wherein wt.-% is based on the total weight of the mixture, and
wherein the $C_{10}$-$C_{15}$ alkyl has a mean degree of branching (iso-index) in the range of ≥1.5 to ≤3.5.

31. The copolymer according to claim 1, which is obtained by reacting a mixture comprising:
(A) ≥36 wt.-% to ≤64 wt.-% of at least one ethylenically unsaturated monomer with a carboxylic function selected from the group consisting of
acrylic acid;
methacrylic acid; and
$C_1$ to $C_4$ monoesters of maleic or itaconic acids,
(B) ≥40 wt.-% to ≤60 wt.-% of at least two different non-ionic ethylenically unsaturated monomers selected from the group consisting of
methyl, ethyl, butyl or 2-ethyl-hexyl esters of acrylic and methacrylic acid,
(C) ≥8 wt.-% to ≤30 wt.-% of at least two different monomers of formula (I)

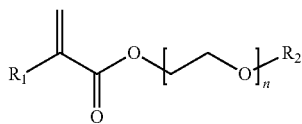

wherein
$R_1$ denotes methyl,
n is a real number in the range of ≥10 to ≤60, and
$R_2$ denotes branched, unsubstituted $C_{12}$-$C_{15}$ alkyl,
(D) ≥0 wt.-% to ≤0.5 wt.-% of at least one crosslinking reagent selected from the group consisting of
ethylene glycol diacrylate;
ethylene glycol dimethacrylate;
trimethylolpropanetriacrylate;
trimethylolpropanetrimethacrylate;
allyl acrylate;
methylenebisacrylamide;
methylenebismethacrylamide;
tetrallyloxyethane;
triallylcyanurates;
allylic ethers of pentaerythritol, sorbitol, or sucrose, and
a diallylester of phthalic acid, (E) ≥0 wt.-% to ≤5 wt.-% of at least one ethylenically unsaturated monomer which is different from (A), (B), and (C), selected from the group consisting of
linear, branched, cycloaliphatic or arylaliphatic esters of acrylic or methacrylic acids,
isomers of butyl (meth)acrylate;
isomers of hexyl (meth)acrylate, n-octyl (meth)acrylate, 2-ethylhexyl (meth)acrylate, 1-decyl (meth)acrylate, 2-decyl (meth)acrylate or isodecyl (meth)acrylate;
isomers of dodecyl (meth)acrylate, cyclohexyl (meth)acrylate, isobornyl (meth)acrylate or benzyl (meth)acrylate;
vinylaromatic monomers; and
amide or nitrile derivatives of (meth)acrylic acids,
(F) ≥0 wt.-% to ≤0.5 wt.-% of at least one chain transfer agent selected from the group consisting of
N-dodecyl mercaptan;
n-decyl mercaptan;
octyl mercaptan;
1,8-dimercapto-3,6-dioxaoctane;
thiolactic acid;
tert-dodecanthiol;
2-(ethylhexyl)thioglycolate and
terpinolene,
wherein wt.-% is based on the total weight of the mixture, and
wherein the $C_{12}$-$C_{15}$ alkyl has a mean degree of branching (iso-index) in the range of ≥1.8 to ≤2.8.

32. The copolymer according to claim 1 which is obtained by reacting a mixture consisting of:
(A) ≥30 wt.-% to ≤70 wt.-% of at least one ethylenically unsaturated monomer with a carboxylic function,
(B) ≥30 wt.-% to ≤70 wt.-% of at least one non-ionic ethylenically unsaturated monomer,
(C) ≥1 wt.-% to ≤40 wt.-% of at least one monomer of formula (I)

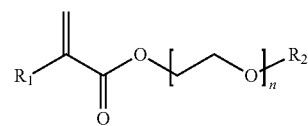

wherein
$R_1$ denotes hydrogen or methyl,
n is a real number in the range of ≥10 to 80, and
$R_2$ denotes branched, unsubstituted $C_{10}$-$C_{15}$ alkyl,
(D) ≥0 wt.-% to ≤1 wt.-% of at least one crosslinking reagent,
(E) ≥0 wt.-% to ≤10 wt.-% of at least one ethylenically unsaturated monomer which is different from (A), (B), and (C), and
(F) ≥0 wt.-% to ≤1 wt.-% of at least one chain transfer agent, and
wherein wt.-% is based on the total weight of the mixture, and
wherein the $C_{10}$-$C_{15}$ alkyl has a mean degree of branching (iso-index) in the range of ≥1.5 to ≤3.5.

33. The copolymer according to claim 32, wherein the $C_{10}$-$C_{15}$ alkyl has a mean degree of branching (iso-index) in the range of ≥1.8 to ≤2.8.

34. The copolymer according to claim 1, wherein the at least one non-ionic ethylenically unsaturated monomer (B) is selected from the group consisting of
1) methyl, ethyl, butyl or 2-ethyl-hexyl esters of acrylic and methacrylic acid;
2) acrylonitrile;
3) vinyl acetate;
4) styrene;
5) methylstyrene;
6) diisobutylene, vinylpyrrolidone, and
7) vinylcaprolactam.

35. A method for manufacturing the copolymer according to claim 1, the method comprising:
copolymerizing in a liquid medium a monomer mixture comprising:
(A) ≥30 wt.-% to ≤70 wt.-% of at least one ethylenically unsaturated monomer with a carboxylic function,
(B) ≥30 wt.-% to ≤70 wt.-% of at least one non-ionic ethylenically unsaturated monomer,
(C) ≥1 wt.-% to ≤40 wt.-% of at least one monomer of formula (I), and

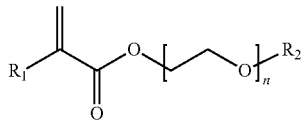

wherein
$R_1$ denotes hydrogen or methyl,
n is a real number in the range of ≥10 to ≤80, and
$R_2$ denotes branched, unsubstituted $C_{10}$-$C_{15}$ alkyl, and (D) ≥0 wt.-% to ≤1 wt.-% of at least one crosslinking reagent,
(E) ≥0 wt.-% to ≤10 wt.-% of at least one ethylenically unsaturated monomer which is different from (A), (B), and (C), and
(F) ≥0 wt.-% to ≤1 wt.-% of at least one chain transfer agent,
wherein wt.-% is based on the total weight of the mixture, and
wherein the $C_{10}$-$C_{15}$ alkyl has a mean degree of branching (iso-index) in the range of ≥1.5 to ≤3.5.

36. The method according to claim 35, wherein the liquid medium comprises water, surfactants, said crosslinking agent, said chain transfer agent and an initiator.

37. An aqueous composition in the form of a coating formulation, which comprises:
≥0.01 wt.-% to ≤10 wt.-%, based on the total weight of the aqueous composition, of at least one copolymer according to claim 1,
≥15 wt.-% to ≤99.9 wt.-%, based on the total weight of the aqueous composition, of water and at least one component selected from the group consisting of pigments, fillers, binders, solvents, defoamers, a neutralising agent, a wetting agent, and pigment dispersing agents.

38. The aqueous composition according to claim 37, wherein the composition is a paint, lacquer, varnish, paper coating, wood coating, adhesive, cosmetic formulation, detergent formulation, textile and drilling muds plaster formulations, formulations for plasterboard, formulations for hydraulic binders, formulations for ceramics and formulations for leather.

* * * * *